(12) United States Patent  (10) Patent No.: US 8,502,060 B2
Ribner  (45) Date of Patent: Aug. 6, 2013

(54) DRUM-SET TUNER

(71) Applicant: Overtone Labs, Inc., Tewksbury, MA (US)

(72) Inventor: David Byrd Ribner, Tewksbury, MA (US)

(73) Assignee: Overtone Labs, Inc., Tewksbury, MA (US)

( * ) Notice: Subject to any disclaimer, the term of this patent is extended or adjusted under 35 U.S.C. 154(b) by 0 days.

(21) Appl. No.: 13/768,799

(22) Filed: Feb. 15, 2013

(65) Prior Publication Data

US 2013/0139672 A1  Jun. 6, 2013

Related U.S. Application Data

(63) Continuation of application No. 13/688,822, filed on Nov. 29, 2012.

(60) Provisional application No. 61/564,954, filed on Nov. 30, 2011, provisional application No. 61/586,183, filed on Jan. 13, 2012.

(51) Int. Cl.
  *G10H 7/00*  (2006.01)
(52) U.S. Cl.
  USPC ............................... 84/616; 84/454
(58) Field of Classification Search
  USPC .................... 84/616, 654, 454, 455
  See application file for complete search history.

(56) References Cited

U.S. PATENT DOCUMENTS

| | | |
|---|---|---|
| 4,023,462 A | 5/1977 | Denov et al. |
| 4,453,448 A | 6/1984 | Miesak |
| 4,539,518 A | 9/1985 | Kitayoshi |
| 4,741,242 A | 5/1988 | Aronstein |
| 5,423,241 A | 6/1995 | Scarton et al. |
| 5,598,505 A | 1/1997 | Austin et al. |
| 5,770,810 A | 6/1998 | Lombardi |
| 5,920,026 A | 7/1999 | Yoshino et al. |
| 6,066,790 A | 5/2000 | Freeland et al. |
| 6,121,538 A | 9/2000 | Yoshino et al. |
| 6,271,458 B1 | 8/2001 | Yoshino et al. |
| 6,725,108 B1 | 4/2004 | Hall |
| 6,756,535 B1 | 6/2004 | Yoshino et al. |

(Continued)

FOREIGN PATENT DOCUMENTS

| | | |
|---|---|---|
| JP | 2002516418 | 6/2002 |
| JP | 2005301318 A | 10/2005 |

(Continued)

OTHER PUBLICATIONS

Toulson, Rob et al., "Percussion Acoustics and Quantitative Drum Tuning", Audio Engineering Society Tutorial T3, New York, Oct. 2009; 31 pages.

(Continued)

*Primary Examiner* — Jeffrey Donels

(74) *Attorney, Agent, or Firm* — Guerin & Rodriguez, LLP; Timothy P. Collins

(57) ABSTRACT

Provided are systems and methods for resonance tuning. A signal is received in response to a resonance of a structure. A frequency or musical note related to an overtone is determined from the signal. The frequency or musical note related to the overtone is selected as a filter mode reference frequency or musical note. A display of frequencies or musical notes from a subsequent signal that deviate from the filter mode reference frequency or musical note by a predetermined threshold is suppressed.

15 Claims, 20 Drawing Sheets

U.S. PATENT DOCUMENTS

| | | |
|---|---|---|
| 6,812,392 B2 | 11/2004 | Brando |
| 6,925,880 B1 | 8/2005 | Roberts |
| 6,996,523 B1 | 2/2006 | Bhaskar et al. |
| 7,271,329 B2 | 9/2007 | Franzblau |
| 7,272,556 B1 | 9/2007 | Aguilar et al. |
| 7,288,709 B2 | 10/2007 | Chiba |
| 7,323,629 B2 | 1/2008 | Somani et al. |
| 7,376,553 B2 | 5/2008 | Quinn |
| 7,385,135 B2 | 6/2008 | Yoshino et al. |
| 7,493,254 B2 | 2/2009 | Jung et al. |
| 7,547,840 B2 | 6/2009 | Noh et al. |
| 7,598,447 B2 | 10/2009 | Walker et al. |
| 7,672,843 B2 | 3/2010 | Srinivasan et al. |
| 7,888,568 B2 | 2/2011 | Kashioka |
| 7,982,114 B2 | 7/2011 | Applewhite et al. |
| 8,076,564 B2 | 12/2011 | Applewhite |
| 8,244,527 B2 | 8/2012 | Srinivasan et al. |
| 8,283,544 B2 | 10/2012 | Zuffante et al. |
| 8,309,834 B2 | 11/2012 | Gehring et al. |
| 2004/0089136 A1 | 5/2004 | Georges et al. |
| 2005/0223880 A1 | 10/2005 | Yoshino et al. |
| 2005/0232411 A1 | 10/2005 | Srinivasan et al. |
| 2008/0052068 A1 | 2/2008 | Aguilar et al. |
| 2008/0229907 A1 | 9/2008 | Clark |
| 2009/0271182 A1 | 10/2009 | Athineos et al. |
| 2009/0288547 A1 | 11/2009 | Lazovic |
| 2010/0083812 A1 | 4/2010 | Peavey |
| 2010/0195837 A1 | 8/2010 | Srinivasan et al. |
| 2010/0212475 A1 | 8/2010 | Toulson |
| 2011/0179939 A1 | 7/2011 | Ribner |
| 2011/0252943 A1 | 10/2011 | Zuffante et al. |
| 2012/0240749 A1 | 9/2012 | Bjornson |

FOREIGN PATENT DOCUMENTS

| | | |
|---|---|---|
| JP | 2006227452 A | 8/2006 |
| JP | 2006010869 A | 12/2006 |
| JP | 2008070581 A | 3/2008 |
| JP | 2008090058 A | 4/2008 |
| JP | 2008090202 A | 4/2008 |
| JP | 2008129539 A | 5/2008 |
| JP | 2009528550 A | 8/2009 |
| JP | 2010061107 A | 3/2010 |
| WO | 2009010713 A1 | 1/2009 |

OTHER PUBLICATIONS

Richardson, Phillip et al., "Fine Tuning Percussion—A New Educational Approach", 2010, 18 pages.

Toulson, Rob et al., "The Perception and Importance of Drum Tuning in Live Performance and Music Production", Journal on the Art of Record Production, ISSN 1754-9892, Issue 4, Oct. 2009, 7 pages.

PGM Richardson et al., "Clearing the Drumhead by Acoustic Analysis Method", 2010, 8 pages.

Worland, Randy, "Normal Modes of a Musical Drumhead Under Non-Uniform Tension", Journal of the Acoustical Society of America, Jan. 2010, 10 pages.

Sunohara Masahiro et al. "The Acoustics of Japanese Wooden Dums called "Mokugyo"", Journal of the Acoustical Society of America, Apr. 2005, 13 pages.

International Search Report and Written Opinion in related international patent application No. PCT/US2011/020751 mailed on Sep. 28, 2011; 12 pages.

Richardson et al., "Clearing the Drumhead by Acoustic Analysis Method", 2010, 8 pages.

International Search Report and Written Opinion in related international application No. PCT/US2012/066999, mailed on Mar. 13, 2013; 12 pages.

Non-Final Office Action in related U.S. Appl. No. 13/004,166, mailed on Apr. 2, 2013; 8 pages.

Drum

Drum Transient Response

Drum Power Spectrum

Drum Tuner

Pitch Estimator

Power-Spectral Estimator

Burst Detector

Pitch-Set Processor

Automatic Drum Tuning

DRUM-SET TUNER

RELATED APPLICATIONS

This application is a continuation patent application of U.S. patent application Ser. No. 13/688,822, filed on Nov. 29, 2012, which claims the benefit of U.S. Provisional Patent U.S. Provisional Application Ser. No. 61/564,954, filed on Nov. 30, 2011 entitled "Drum and Drum-Set Tuner" and U.S. Provisional Application Ser. No. 61/586,183, filed on Jan. 13, 2012, entitled "Drum and Drum-Set Tuner", the entirety of each of which is incorporated by reference herein. This application is related to U.S. patent application Ser. No. 13/004, 166, filed Jan. 11, 2011, entitled "Drum and Drum-Set Tuner", and published as U.S. Patent Application Publication No. 2011/0179939, the entirety of which is incorporated by reference herein.

FIELD OF THE INVENTION

The invention relates generally to spectral analysis. More specifically, the invention relates to detection of a fundamental frequency to facilitate tuning of a resonant structure.

BACKGROUND

A variety of structures resonate with a fundamental frequency often combined with a plurality of other frequencies that make detection and analysis of the fundamental frequency problematic. Furthermore, many structures resonant for only a short period of time. A particular example of a resonant structure is a drum.

In one example, a drum consists of a hollow cylinder with a circular membrane clamped to either or both ends of the cylinder. A circular membrane that is suspended under tension at its outer perimeter is capable of several modes of vibration including circular symmetric and angular modes. The circular modes are described by a series of first-order Bessel functions for example and are therefore not harmonically related. The frequency of vibration depends, in part, on the radius, tension and density of the membrane. A cylindrical air column also resonates with the frequency of resonance depending on the length of the drum and the speed of sound and whether or not the ends of the cylinder are open or closed. Furthermore, the combination of a cylindrical shell and cylindrical membranes resonates as a system at a variety of frequencies that depend on a number of parameters, such as the dimensions of the drum, the tension and density of the drumheads and the composition of the shell.

In one example, a drumhead is held by a metal or wooden hoop that is attached to a drum shell with several adjustable tension screws. The tension of the drumhead is determined by the force exerted by the tension screws. Tuning involves adjusting the tension screws to achieve a uniform pitch over a drumhead. When the pitch is uniform around the perimeter of the drum, the drumhead is considered to be "cleared" or "in tune with itself." In addition to being in tune with itself, each drumhead needs to be adjusted to a pitch that produces the desired overall sound. It is sometimes desirable to tune each head separately with the other held damped to prevent vibration.

Striking a drum produces a percussive sound that's shorter in duration than any non-percussive musical instrument. The time-domain response of a typical drum consists of an oscillatory signal with an abrupt onset followed by a short, approximately exponential, decay. Air pressure acting on the large area of the drumhead limits the duration of the sound. A vibrating string on the other hand has a much smaller area than a drumhead and vibrates much longer in comparison.

Tuning a set of drums poses additional challenges for musician. Some drummers tune their drums to a musical chord such as a major chord. Other drummers tune their drums to relative tonic intervals such as thirds or fifths, and still others tune by ear to something suiting their musical taste. The choice of specific drum pitches sometimes depends on the type of music being played. A drum-set might be tuned higher for jazz than for rock, for example, or it might be tuned open to resonate for a live performance or tight for a recording. Tuning also depends on the size and type of drum. A larger diameter drum is usually tuned lower than a smaller diameter drum. Often drummers attempt to copy the pitches used by other drummers from recordings or from memory. In general, the desired tuning of a drum-set depends on the particular sound the drummer is looking for.

A drum produces a unique sound when its head is struck resulting from the resonance of the vibrating heads in conjunction with the shell of the drum. Striking a drum excites several rapidly-decaying, non-harmonic modes of vibration resulting in a short, complex burst of sound. Drum tuning, by adjustment of a drumhead tension, to control pitch, tone and timber is essential in establishing a pleasing drum sound. Tuning any musical instrument involves playing a note, measuring or comparing the pitch of the note to some reference and adjusting the instrument's pitch until it conforms to the reference. However, assessing the pitch of a drum is complicated by the short duration and multiple non-harmonic resonances comprising its sound. Melodic instruments, on the other hand, produce continuous, periodic (harmonic) sounds with easy to measure pitch and are therefore much simpler to tune than a drum.

Drum tuning is typically done by ear, which is an art subject to the skill and taste of an individual musician. In addition, tuning by ear is inaccurate and has poor repeatability of results. Moreover, it is increasingly difficult to tune by ear when tuning a drum-set where each drum typically is tuned to a different pitch or to tune the drum-set to a variety of popular drum-set sounds varying based on style of music or the acoustic properties of the physical environment within which the drum-set will be used.

Existing tuners for melodic instruments such as guitars and pianos are unsuitable for drum or drum-set tuning. They require a sustained tone duration that is longer than the duration of a drum sound and only operate correctly on a periodic signal consisting of a single fundamental and associated harmonics, not on the transient sound produced by a drum. Drums typically create overtones unlike harmonics that are more easily distinguished from the fundamental frequency. Overtones are typically related to the fundamental frequency by a product of $\pi$ (pi), being related to the area and circumference of the drumhead.

Mechanical tuning devices exist that measure the tension of the drumhead by measuring the deflection of the head for a given force but do not measure the pitch produced by a drum and thus suffer from a variety of inaccuracies due to drum skin thickness and temperature variations for example.

BRIEF SUMMARY

In one aspect, provided is a method for resonance tuning. A signal is received in response to a resonance of a structure. A frequency or musical note related to an overtone is determined from the signal. The frequency or musical note related to the overtone is selected as a filter mode reference frequency or musical note. A display of frequencies or musical notes from a subsequent signal that deviate from the filter mode reference frequency or musical note by a predetermined threshold is suppressed.

In another aspect, provided is tuning device, comprising a receiver, a module, a memory, and a filter. The receiver is constructed and arranged to receive a signal generated in response to a resonance of a structure. The module determines a frequency or musical note related to an overtone from the signal. The memory stores the frequency or musical note related to the overtone as a filter mode reference frequency or musical note. The filter suppresses a display of frequencies or musical notes that deviate from the filter mode reference frequency or musical note by a predetermined threshold.

In another aspect, provided is a hands-free tuning device, comprising a resonance tuner having a top surface and a bottom surface, a microphone in electronic communication with the resonance tuner and a clamp coupled to the tuner. The clamp is constructed and arranged for removably coupling to a drum. The microphone is positioned near the drumhead of the drum to sense an acoustic signal output from the drum.

In another aspect, provided is a method for pitch detection, comprising providing one or more power spectrum frequency samples; and selecting a frequency in a frequency band having a largest power spectrum magnitude from the one or more power spectrum frequency samples, the frequency band having an upper frequency limit and a lower frequency limit.

In another aspect, provided is a method for resonance tuning, comprising: receiving a signal in response to a first resonance of a structure; determining a frequency of the signal; storing the determined frequency as a difference mode reference frequency; receiving a subsequent signal in response to a second resonance of the structure; determining a frequency of the subsequent signal; and displaying a value corresponding to a difference between the difference mode reference frequency and the frequency of the subsequent signal.

In another aspect, provided is a tuning device, comprising: a receiver constructed and arranged to receive a signal generated in response to a first resonance of a structure; a signal determination circuit that determines a frequency of the signal; a memory that stores the determined frequency as a difference mode reference frequency; and a difference mode processor that determines a value corresponding to a difference between the difference mode reference frequency and the frequency of the subsequent signal.

In another aspect, provided is a method for resonance tuning, comprising: method for resonance tuning, comprising: receiving a signal in response to a resonance of a structure; measuring a frequency of the signal; displaying a value related to the frequency; storing the value related to the frequency; retrieving the stored value related to the frequency; and displaying the retrieved value.

In another aspect, provided is a tuning device, comprising: a receiver constructed and arranged to receive a signal generated in response to a resonance of a structure; a module that measures a frequency of the signal; a memory that stores a value related to the frequency; and a display having a first display region that displays the value prior to storage at the memory and a second display region that displays the value retrieved from the memory.

BRIEF DESCRIPTION OF THE SEVERAL VIEWS OF THE DRAWINGS

The above and further advantages of this present inventive concepts may be better understood by referring to the following description in conjunction with the accompanying drawings, in which like numerals indicate like structural elements and features in various figures. The drawings are not necessarily to scale, emphasis instead being placed upon illustrating the principles of the present inventive concepts.

DETAILED DESCRIPTION

Embodiments of resonance tuners described herein provide for the measurement of a fundamental frequency of a structure from a short duration transient signal that typically includes other frequencies. In one embodiment, the resonant structure is a vibrating blade in a turbine engine. The signal is measured by acoustic emissions from the blade. In another embodiment, the signal from the blade is measured with an interferometer. In another embodiment, the resonant structure is a vocal cord from a person practicing musical scales. A microphone measures the signal from the vocalist.

In a preferred embodiment, the resonant structure is a drumhead, with a signal measured by a receiver or sensor. The fundamental pitch of a drum is measured to facilitate drum tuning. A receiver produces an electrical signal corresponding to the sound or vibration produced by the drum, after the drum is struck.

Figure 1:
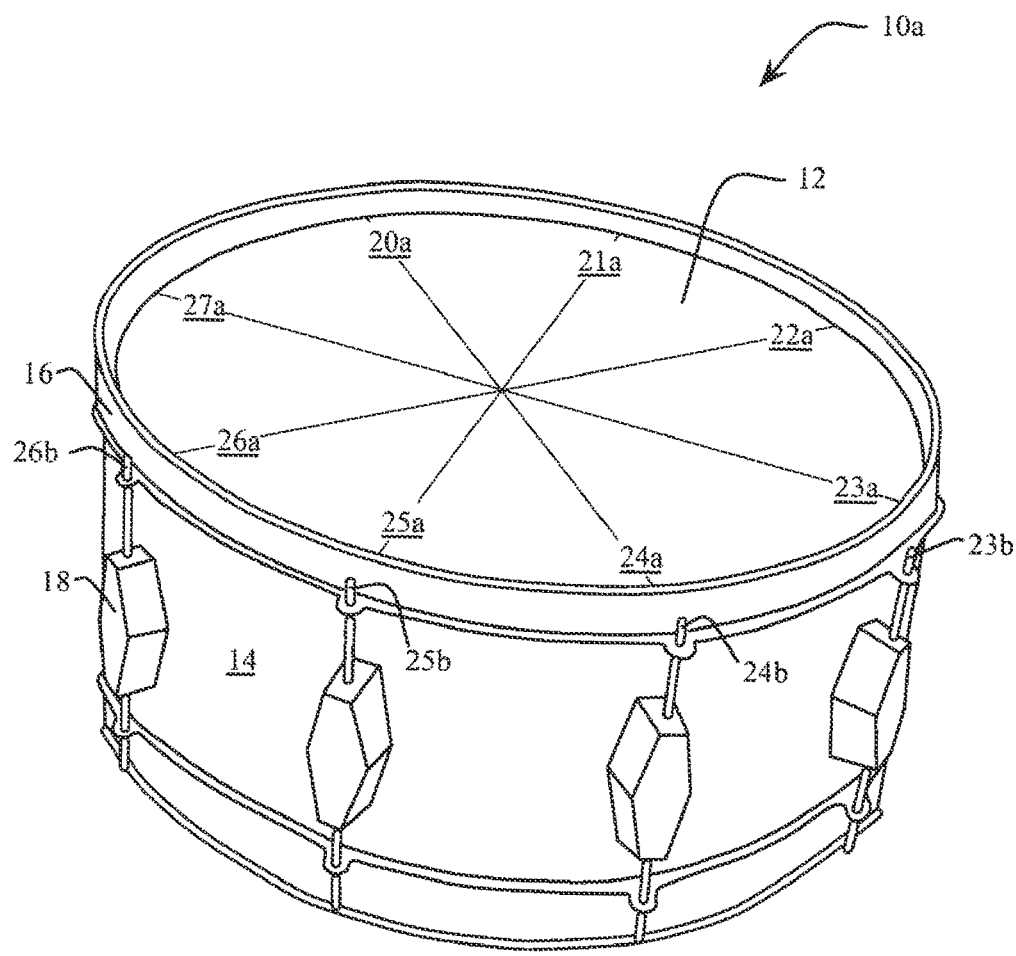
FIG. 1 is a perspective view of a drum usable with embodiments of the present inventive concepts.

FIG. 1 shows a perspective view of a typical "tom-tom" drum 10a, which in one example, is used with the present inventive concepts. The drum 10a includes a circular membrane (drumhead) 12 suspended under tension on top of the drum shell 14 by a hoop 16. The tension of the membrane 12 is adjusted by tightening the hoop 16 with a plurality of lugs 20b, 21b, 22b, 23b, and 27b (not shown in FIG. 1) and lugs 23b, 24b, 25b and 26b. Each lug is affixed to the drum shell 14 by an attachment 18. The drum shown in FIG. 1 shows a single membrane 12, although in other embodiments a second membrane is present on the opposing side of the drum. In one embodiment, when an opposing membrane is present, the opposing membrane is "damped" or put on a towel or cushion to substantially prevent the opposing membrane from interacting with the membrane 12 during the tuning of membrane 12. Subsequent to tuning the membrane 12, the opposing membrane is tuned with membrane 12 damped. In another embodiment, the membrane 12 is tuned without damping the opposing membrane.

Adjusting the tension of the membrane 12 requires adjusting each of the lugs to "clear" the drum and adjusting all of the lugs to achieve a desired pitch. Each lug is adjusted by imparting energy to the membrane 12 in the vicinity of the lug. For example, to adjust lug 24b, a musician would tap the membrane 12 near location 24a. Similarly, to adjust lug 25b, the musician would tap the membrane 12 near location 25a. Tapping is typically performed by striking the membrane 12 with a drum stick, although approaches where an impulse of energy is delivered to the membrane 12 are envisioned.

Figure 2:
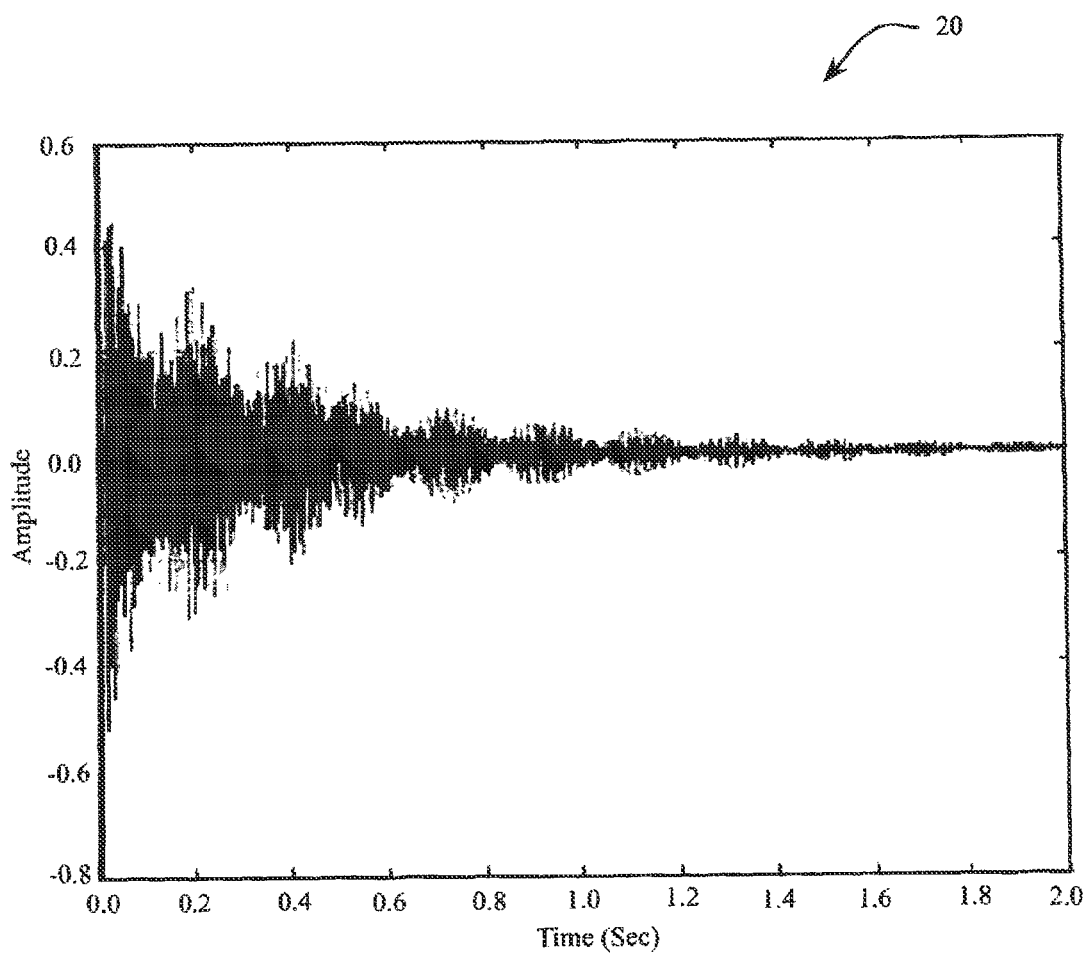
FIG. 2 is graphical view of a measured time-domain response of one embodiment of a drum with opposing drumhead damped when struck.

FIG. 2 shows a measured time-domain response of an example embodiment when the membrane 12 is struck, at location 24a for example with the opposing membrane damped. FIG. 3 shows a calculated power spectrum of FIG. 2 according to an embodiment of the present inventive concepts. Multiple spectral peaks 36, 38, 40 and 42 are calculated from the time-domain response shown in FIG. 1. The spectral peaks are further grouped into subsets 32 and 34 based on their spectral proximity. For example, spectral peaks 36 and 38 are grouped into the same subset 32 because they are sufficiently related based on frequency separation. Similarly, spectral peaks 40 and 42 are grouped into subset 34.

In this example, the opposing membrane is damped, and the lowest frequency mode of vibration of a two-headed drum referred to as the fundamental frequency of the drum is suppressed such that the vibrational modes of the top or batter drumhead are evident. The damping also prevents the batter drumhead from vibrating in a fundamental mode or any other modes with circular symmetry of the membrane. In the example shown in FIG. 3A, subset 32 therefore corresponds to the lowest frequency mode of vibration with the opposing drumhead damped and includes the lowest-order overtones of the batter drumhead. The lowest-order drumhead overtone can be referred to as the fundamental frequency of a tuning lug if the opposing drumhead is damped. If the drumhead is not damped, it can be referred to as the lowest overtones. Referring again to FIG. 3A, spectral peaks 36 and 38 within subset 32 each corresponds to a fundamental frequency of one of two lugs, which are out of tune with respect to each other. In one example, spectral peak 36 corresponds to a fundamental frequency associated with lug 24b, and spectral peak 38 corresponds to a fundamental frequency associated with nearby lug 25b. The subset 32 is a "fundamental subset" because it contains a spectral peak with the lowest frequency, excluding zero Hz. (D.C.). The spectral peaks 40 and 42 correspond to higher overtones, which are undesirable higher frequency byproducts of the fundamental spectral peak produced when the initial impulse travels across the circular drum and around the periphery of the drum, in addition to other complex propagation paths. The highest amplitude spectral peak 36 within the fundamental subset 32 is chosen as the "fundamental spectral peak" associated with the lug 24b being tuned. Subsequently, lug 24b is tuned so that the fundamental spectral peak 36 matches a selected pitch. Each lug of the drum 10a is tuned in the manner described above until all lugs are "cleared" and tapping the drum 10a at any location 20a, 21a, 22a, 23a, 24a, 25a, 26a or 27a produces substantially the same fundamental pitch, which also corresponds to the selected pitch.

Figure 3A:
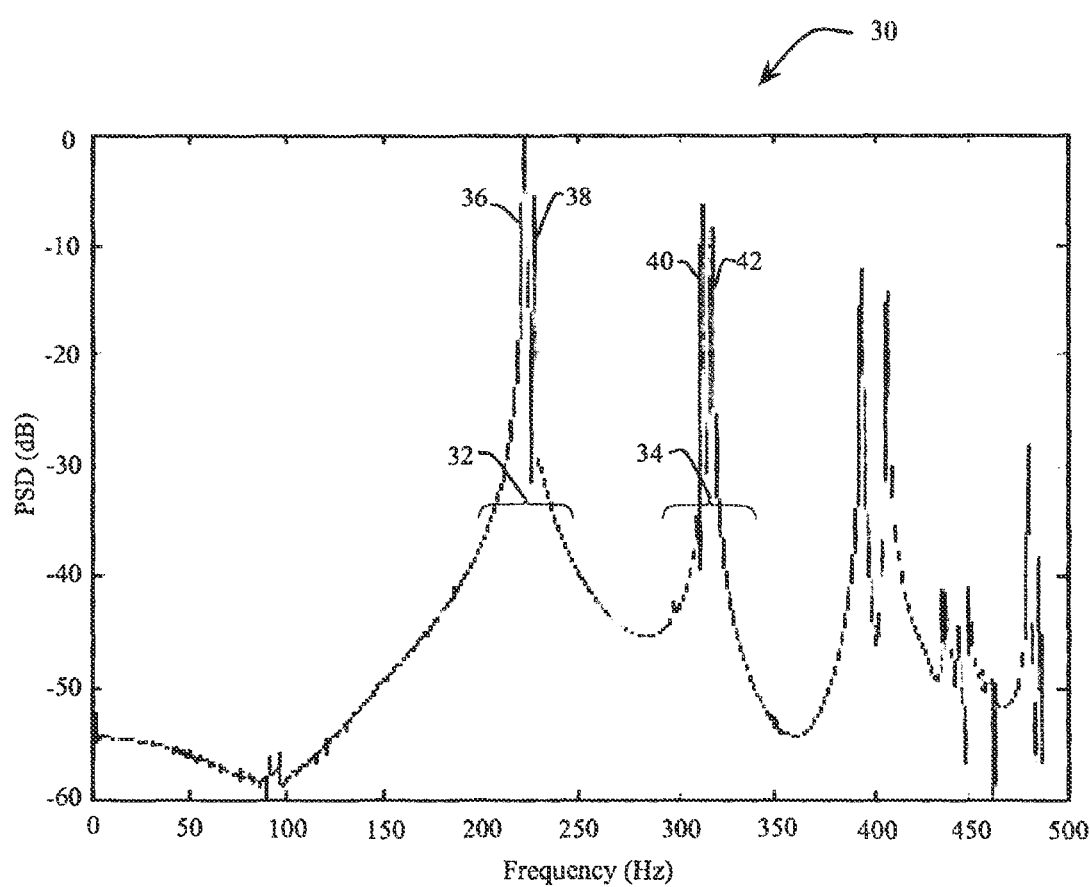
FIG. 3A is a graphical view of a calculated power spectrum of the time-domain response as illustrated in FIG. 2 and according to an embodiment of the present inventive concepts.
Figure 3B:
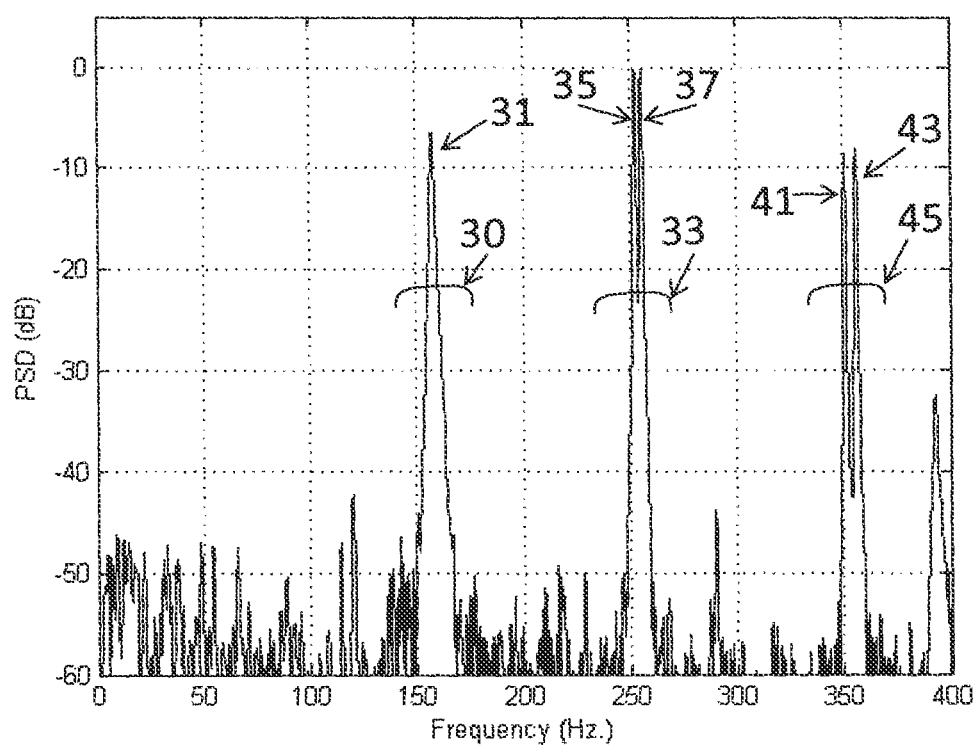
FIG. 3B is a graphical view of a calculated power spectrum of an undamped drum when struck near a tuning lug, in accordance with another embodiment of the present inventive concepts.

FIG. 3B illustrates a calculated power spectrum of an undamped drum when tapped near one of the tuning lugs. In this case, the fundamental mode of vibration corresponding to a spectral peak 31 is present and not suppressed by damping. Spectral peaks 35 and 37 correspond to the lowest overtone of the top head comprise frequency subset 33, and spectral peaks 41 and 43 correspond to a higher frequency overtone and comprise frequency subset 45. Uniformly tuning an undamped drum requires matching the pitches of the lowest overtone comprising a frequency subset 33 as the drumhead is tapped near each of the tuning lugs.

Figure 4:
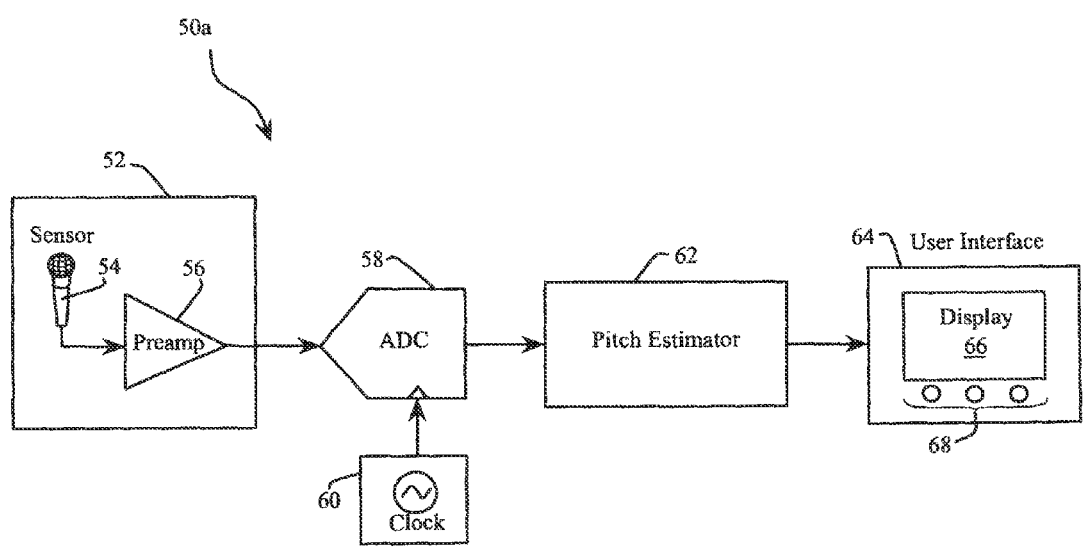
FIG. 4 is schematic view of an embodiment of a Drum-Tuner according to the present inventive concepts.

FIG. 4 shows an example embodiment of a Drum Tuner 50a according to the present inventive concepts. In one example, the Drum Tuner 50a is positioned over the drum 10a close enough (e.g. several inches) to detect the resonance of the membrane 12. The Drum Tuner need not be positioned near the lug being tuned. In one embodiment, the Drum Tuner is attached to the hoop 16 and remains stationary throughout the entire tuning process of one drumhead.

A receiver 52 detects a signal corresponding to a sound or vibration from a resonant structure, the drum 10a in FIG. 1 for example. In one embodiment, the receiver includes a sensor 54, a microphone for example, and a preliminary amplifier (Preamp) 56. The Preamp 56 includes a low pass filter to limit aliasing of subsequently sampled data. The signal received by the sensor 54 is amplified by the Preamp 56 and converted to a representative digital signal by an analog to digital convertor (ADC) 58. In one non-limiting embodiment the ADC 58 includes a 12 bit successive approximation register (SAR) operating at 8 k samples/sec with 8× decimation. The ADC 58 has a clock 60 with sufficient accuracy to determine the fundamental spectral peak 36. In one embodiment, the clock 60 is a crystal oscillator. For example, a clock 60 with 0.01 Hz accuracy for a sample rate of 1 k samples/sec is sufficient. The digital signal from the ADC 58 is processed by a Pitch Estimator 62 that estimates the fundamental spectral peak 36 from the signal received by the receiver 52. In one embodiment, each of the functions performed by the Pitch Estimator 62 are implemented with circuits. In another embodiment, each of the functions performed by the Pitch Estimator 62 are performed with one or more processors. In yet another embodiment, the Pitch Estimator 62 uses a combination of circuits and processors to perform its function. The frequency estimate is provided to a User Interface 64 that in turn displays at least one of the fundamental spectral peak 36, a nearest musical note and the deviation of the fundamental spectral peak 36 from the selected pitch. The user provides a variety of inputs to the Drum Tuner 50*a* with controls 68 on the User Interface 64. For example, inputs provided by the user include the selected pitch, type of drum and what type of information should be displayed. In addition, the User Interface provides controls for storing and recalling specified and measured pitches. Other user inputs are also envisioned within the scope of adjusting parameters of a resonant system in response to detection of a fundamental frequency.

Figure 5:
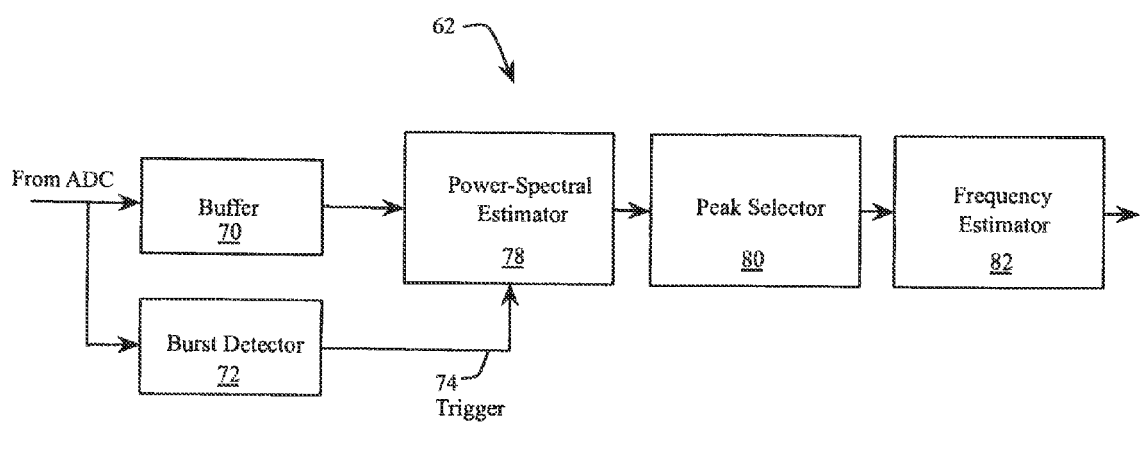
FIG. 5 is a schematic view of an embodiment of the Pitch Estimator shown in FIG. 4.

FIG. 5 shows an embodiment of the Pitch Estimator 62 as referenced in FIG. 4. The Pitch Estimator 62 stores a series of time samples from the ADC 58 in a buffer 70. In one embodiment the Buffer stores 1024 time samples. The number of samples stored in the Buffer is chosen to achieve a sufficient sample size for accurate measurement, to store sufficient samples for the duration of a drum burst, (e.g. 1 second) and to reduce the time required between successive measurements based on typical user expectations. A Burst Detector 72 detects the start of a signal burst typically corresponding to the beginning of the resonance of a structure after the structure has received an impulse of energy, a drum strike for example. In a preferred embodiment, the burst detection occurs after the cumulative energy of the digitized signal exceeds a pre-determined threshold. In another embodiment, the burst detector 72 determines when the digitized signal exceeds a threshold by a hysteresis value. In another embodiment, the burst detector 72 determines when a sum of a plurality of absolute values of the digitized signal exceeds a threshold, (or also a threshold value with hysteresis).

When a burst is detected by the Burst Detector 72, a Trigger signal 74 is enabled. The enabling of the Trigger signal 74 initiates several operations. A pre-determined number of samples of digitized data from the ADC 58 are stored in the Buffer 70 for subsequent processing. In one embodiment, the Power-Spectral Estimator 78 computes the power spectrum of the buffered data by transforming the samples into the frequency domain and computing the magnitude-squared value of the samples. After transformation from the time domain to the frequency domain, the data are generally complex and computing the magnitude-squared value of each sample consists of summing the squares of the real and imaginary values.

The Peak Selector 80 then identifies the spectral peaks of the power spectrum. In a preferred embodiment, the spectral peaks are calculated by first storing the magnitude-squared frequency domain samples in a "power array." The power array is searched to identify the "maximum value power sample." A "minimum peak power threshold" is then defined as a constant value below the maximum value power sample, typically 18 dB lower than the value of the maximum value power sample. The power array is then searched starting at the lowest frequency location and stopping at the highest frequency location and storing the magnitude and frequency of all the spectral peaks that are greater than the minimum peak power threshold in a "peak array." The spectral peaks are defined as samples from the power array with a zero value first derivative and a negative value second derivative when the power array is differentiated with respect to frequency. Typically, only the 10 lowest frequency spectral peaks identified in the ascending search are stored in the "peak array." The peak array will thus contain the first 10 spectral peaks in ascending order of frequency all of which will exceed the minimum power threshold.

In a preferred embodiment, the opposing membrane to the membrane 12 in FIG. 1 is damped. The Frequency Estimator 82 searches through the peak array and where any two successive spectral peaks are spectrally adjacent within a limited frequency bandwidth (or threshold) of 10 Hz for example, if the second spectral peak has a larger magnitude than the first spectral peak, the sequential position of the second spectral peak will be swapped with the first spectral peak. After these steps, the first entry in the peak array corresponds to the estimate of the frequency and magnitude (or power) of the fundamental spectral peak (or fundamental component) of the measure signal. This sorting of the spectral peaks results in a number of subsets, each with at least one spectral peak, where every spectral peak in a subset is spectrally adjacent to another spectral peak within a limited bandwidth (or threshold; e.g. 10 Hz). The spectral peak ordering method determines the fundamental subset having the spectral peak with the lowest frequency and selects the spectral peak with the largest magnitude in the fundamental subset as the fundamental spectral peak.

In another preferred embodiment, the opposing membrane to the membrane 12 in FIG. 1 is not damped (also referred to as "open") and is allowed to couple resonant energy to the membrane 12 when the drum is struck. This coupling of resonant energy introduces a lower frequency spectral peak below the frequency of the fundamental spectral peak generated when tuning with the opposing membrane damped. An open drum is tuned by altering the tuning method used to tune a drum with the opposing membrane damped to exclude the lowest frequency subset and choosing the fundamental spectral peak in the next highest frequency subset.

Figure 6:
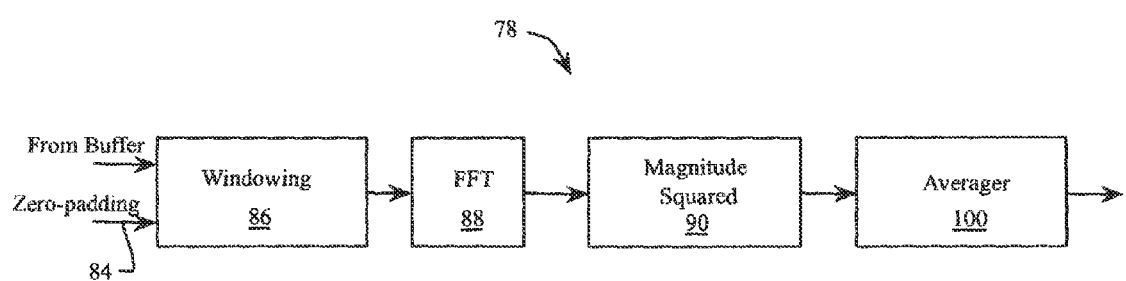
FIG. 6 is a schematic view of an embodiment of the Power-Spectral Estimator shown in FIG. 5.

FIG. 6 shows an embodiment of the Power-Spectral Estimator 78 as referenced in FIG. 5. The Power-Spectral Estimator 78 receives a series of buffered time samples from the Buffer 70 in FIG. 5 and optionally conditions the samples with Zero-padding 84 and Windowing 86 prior to converting the time samples to the frequency domain with a Fast Fourier Transform (FFT) 88. Zero-padding 84 refers to adding zero-value samples to the predominately non-zero value series of time samples to increase the size of the FFT and hence the resulting frequency resolution. For an FFT with N samples, (an "N point FFT"), with sample rate Fs, the frequency resolution is given by the equation $\Delta Fs=Fs/N$, so with a larger sample size N, finer frequency resolution is obtained. For example, in one embodiment, the Buffer 70 stores 1024 samples. By appending 3072 zero-value samples a 4096-point FFT is performed thereby increasing frequency resolution by a factor of 4. Although the buffer could optionally store 4096 samples and zero-padding could be avoided, at an effective 1 khz ADC sampling rate (or 8 kHz with 8 times decimation) the user would have to wait four seconds to fill the buffer while the typical drum burst only last one second as shown in FIG. 2.

The FFT is a specific implementation of a Time-To-Frequency-Transform, defined herein to refer to the conversion of time samples to the frequency domain irrespective of the algorithm used. For example, in other embodiments the Time-To-Frequency-Transform uses either a Discrete Fourier Transform (DFT), a Discrete Cosine Transform (DCT), a Fast Cosine Transform, a Discrete Sine Transform (DST) or a Fast Sine Transform (FST).

In a preferred embodiment Zero-padding 84 is used with Windowing 86. Because the series of time samples, with or without the Zero-padding 84, only represents a finite observation window, the resulting spectral information will be distorted after performing an FFT due to the ringing or sin(f)/f spectral peaks of the rectangular window. This is also referred to as "spectral leakage." To correct for this, each sample in a series of time samples is multiplied by a sample from a fixed waveform such as a Hanning, Bartlett or Kaiser window. In this embodiment these window functions have the same number of samples as the FFT (e.g. 4096), have symmetry about N/2 and increase in value from close to zero at the beginning and end of the time series to a maximum value at the center of the time series. In a preferred embodiment, a Blackman-Harris window function is used.

In a preferred embodiment the time samples are preconditioned with Zero-padding 84 and Windowing 86 and are subsequently converting to the frequency domain with an FFT processor. It is envisioned that any Discrete Fourier Transform (DFT) can be used to perform the frequency conversion without being limited to using an FFT. Following the FFT 88, the series of frequency samples forming an estimate of the frequency spectrum is converted into a power-spectral estimate by squaring each of the frequency samples with a Magnitude Squared function 90.

The Drum Tuner 50a operates on either isolated drum strikes or on a series of repetitive drum strikes. For repetitive drum strikes, the Burst Detector 72 re-triggers prior to the requisite number of time samples (e.g. less than 1024 samples in one embodiment) and the shorter series of time samples is zero-padded to the same length as an isolated burst. For example, an isolated burst has 1024 samples and is zero-padded to 4096 samples by adding an additional 3072 zero value samples. A repetitive strike occurring every 500 ms only has 512 samples in one example and would be extended to 4096 samples by adding 3584 zero value samples. In one embodiment, the Zero-Padding 84 detects the number of samples stored in the Buffer 70 and adjusts the number of zero value samples to be added accordingly, such that 4096 time samples result.

Spectral averaging is performed with an Averager 100 on the estimated power spectrum output for each successive burst thereby increasing the precision of the Power-Spectral Estimator 78 and the resulting estimate of the fundamental spectral peak. Spectral averaging is performed by taking the average of the magnitude-squared value of each frequency sample of the series of frequency samples with the magnitude-squared value of a corresponding previously stored frequency sample. For example, the 2nd frequency sample of a new burst is averaged with the second frequency sample of a previous burst. Zero padding occurs at the end of a shortened burst of time samples, so the proper alignment of time samples from current and previous bursts is maintained.

Figure 7:
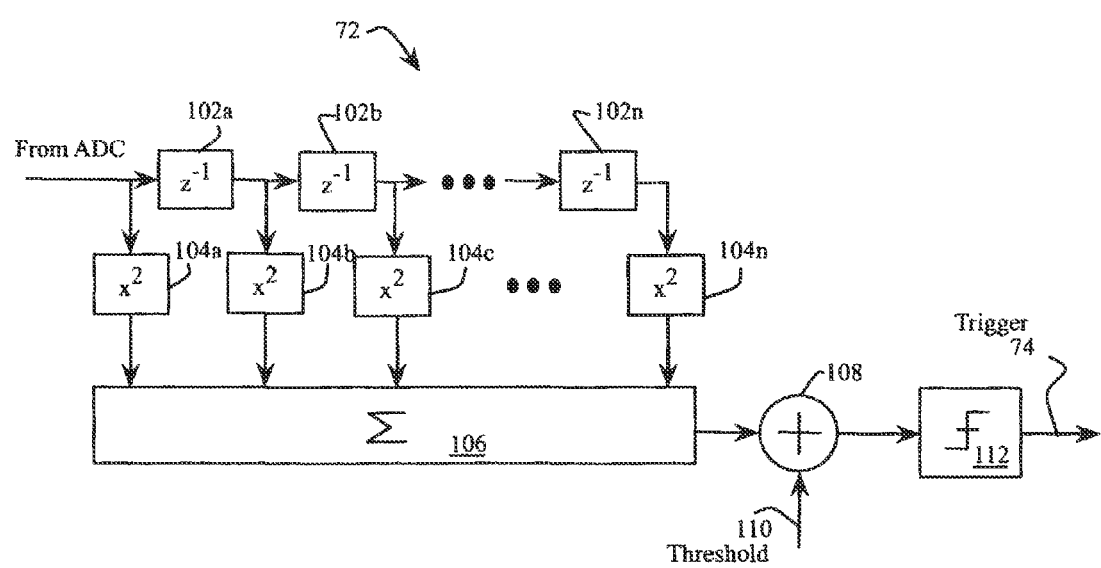
FIG. 7 is a schematic view of an embodiment of the Burst Detector shown in FIG. 5.

In one embodiment, the Burst Detector 72 of FIG. 5 includes a comparator that compares the digitized data from the ADC 58, or it's absolute value, to a threshold to enable the burst-detected Trigger 74. In a preferred embodiment shown in FIG. 7, energy detection is used. Energy detection is more complex but offers more reliable burst detection in the presence of noise sources and glitches. The energy of several consecutive samples (e.g. 8 samples in one embodiment) is calculated by squaring and summing the samples together. Specifically, a plurality of sample and hold circuits 102a, 102b through 102n (generally 102) hold the time samples from the ADC 58. In the example where the ADC 58 uses 12 bit resolution, each sample and hold circuit 102 is a 12 bit register in one embodiment. In another embodiment, the sample and hold circuit 102 is a First In First Out (FIFO) memory. Each time delayed sample from each sample and hold circuit 102 including a time sample without a delay is squared with circuits 104a, 104b, 104c through 104n (generally 104). Specifically, a sample with no delay is squared with circuit 104a, a previous sample held by sample and hold 102a is squared with circuit 104b, and so on. Each squared sample is summed with a summing circuit 106, compared to a Threshold 110 with a subtraction circuit 108, and activates a Trigger 74 if the value is positive as determined by a comparator 112. In a preferred embodiment, the value of the Threshold 110 is 5% of the peak burst energy. In an alternative embodiment using voltage level detection the threshold is 20% of the peak voltage.

Figure 8:
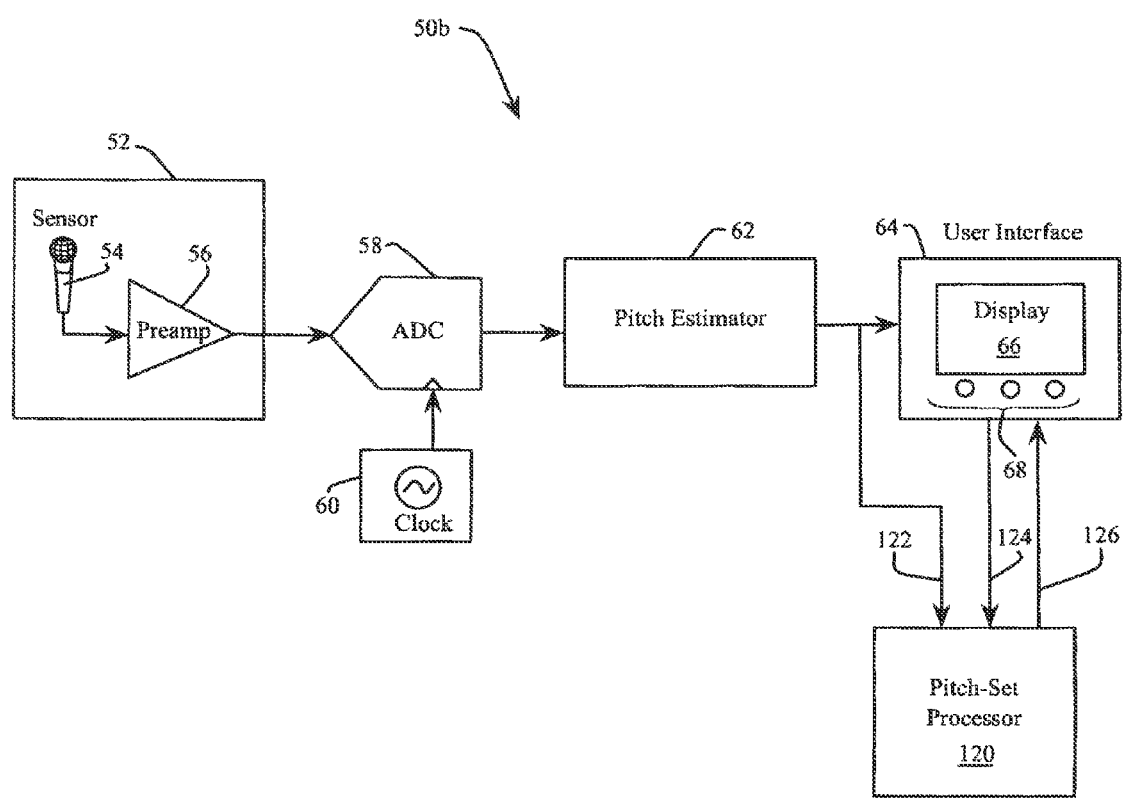
FIG. 8 is a schematic view of an embodiment of a Drum-Set Tuner according to the present inventive concepts.

FIG. 8 shows a Drum-Set Tuner 50b as an alternative embodiment to the Drum Tuner of FIG. 4 including an additional Pitch-Set Processor 120 to facilitate tuning of multiple drums. The Pitch-Set Processor 120 selects the pitches (e.g. the desired fundamental spectral peak) of each drumhead in the drum-set based on criteria provided by the user via a User Interface 64. For example, the user will specify the sizes and number of drums in the drum-set and the type of tuning desired, such as a chord, interval, type of sound, or a famous drummer's tuning. The Pitch-Set Processor 120 then indicates the selected pitch for each drumhead in the drum set thereby assisting the user in tuning each head of each drum to the correct pitch. In addition, the user can store specific or measured drum-set tunings in the Pitch-Set Processor 120 to be recalled at a later time. This storage mode includes pitches or musical notes entered by the user with controls 68 and communicated to the Pitch-Set Processor at 124 or pitches measured with the Drum Tuner by the user and communicated to the Pitch-Set Processor at 122. The Selected Pitch calculated by the Pitch-Set Processor 120 is communicated to the Display 66 at 126.

Figure 9:
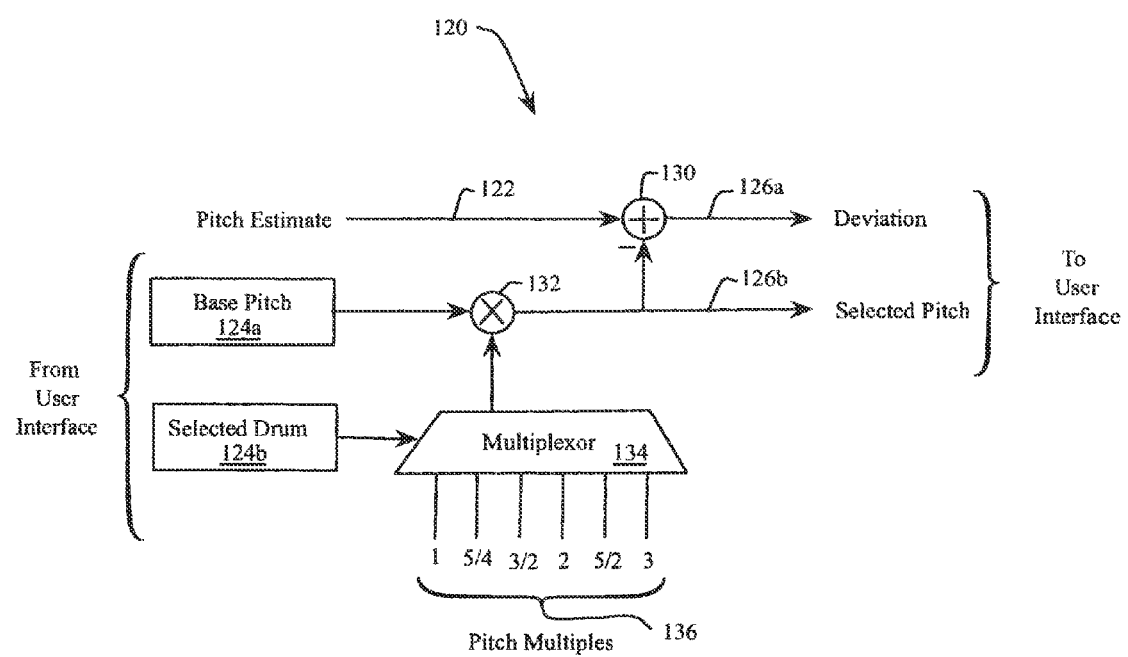
FIG. 9 is a schematic view of an embodiment of a Pitch-Set Processor shown in FIG. 8.

FIG. 9 shows a preferred embodiment of the Pitch-Set Processor 120 that determines the Selected Pitch 126b for tuning each of the drums in a set of drums to pitches comprising the notes in an extended Major chord. For example, the Major chord has pitches that are in increasing order relative to the lowest or Base Pitch 124a are 1, 5/4, 3/2, 2, 5/2 and 3, shown collectively as Pitch Multiples 136. The Base Pitch 124a and the Selected Drum 124b from the drum-set are supplied from the User Interface 64. The Selected Pitch 126b is computed according to its position in the chord as a product 132 of the Base-Pitch 124a and the selected Pitch Multiple 134, the Pitch Multiple 136 being selected by Multiplexor 134 controlled by the Selected Drum 124b. In addition to computing the Selected Pitch 126b, the Deviation 126a of the Selected Pitch 126b from the Pitch Estimate 122, (e.g. the fundamental spectral peak) is calculated by subtracting the Selected Pitch 126b from the Pitch Estimate 122 with the subtraction circuit 130. The Selected Pitch 126b and the Deviation 126a are both conveyed to the Display 66 at 126 shown in FIG. 8.

Figure 10:
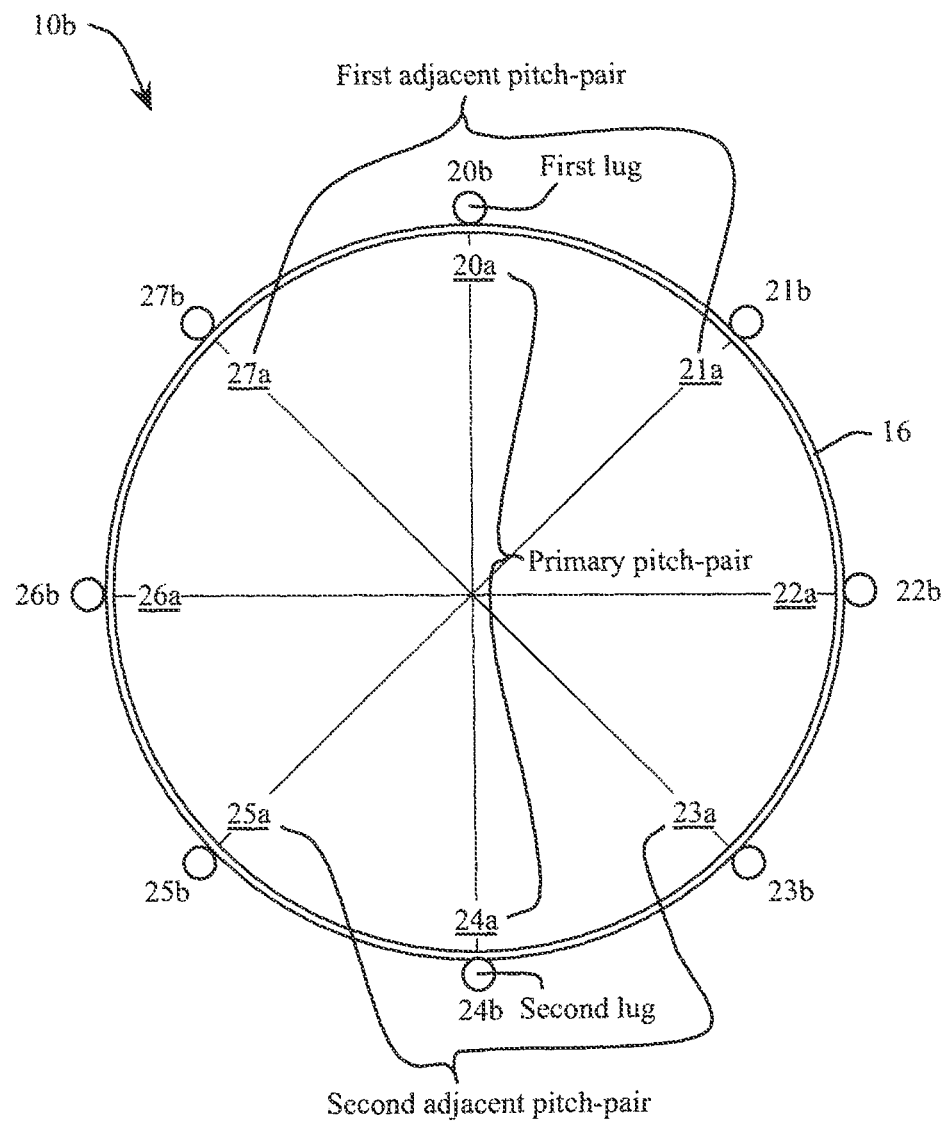
FIG. 10 is a top view of the drum shown in FIG. 1.

FIG. 10 is top view of the drum 10a shown in FIG. 1 illustrating an automatic tuning method according to a preferred embodiment of the present inventive concepts. The Drum Tuner of FIG. 4 enables a user to tune a drum by measuring the individual pitches (e.g. the fundamental spectral peak) near each tuning lug and making corresponding adjustments to the lug tensions until the pitches are uniform. However, this is an iterative approach involving repeated pitch measurements and lug adjustments because the tension and pitch of the drumhead adjacent to a tuning lug depends not only on the tension of the closest lug but also to a lesser extent on the tension of all the other lugs. Consequently, there is an interaction between the tensioning of each lug.

For example, tightening a lug to raise the nearby drumhead pitch will also raise the pitch near the two adjacent lugs and the opposite lug to some extent. This inherent interaction between the tension of a single lug and the pitch of other lugs complicates drumhead tuning and increases the number of iterations that are required before uniformity is achieved. It would therefore be advantageous to automate the drumhead tuning process to account for the tension lug interaction and thereby minimize the number of iterations to simplify and speed up the tuning of a drumhead. This would also save the user the task of remembering the various pitches around the drumhead.

In the process of tuning a drumhead, it is possible to either increase the tension of the lugs corresponding to lowest pitch, or to lower the tension of the lugs corresponding to highest pitch, the former being preferable. Lowering the tension of a lug results in a partial de-seating of the lug screw and a less predictable or stable tension setting. As such, the following description is based on increasing tuning lug tension to raise the pitch of the lower pitched sections of the drumhead to match the pitch of the higher pitched sections.

Referring to FIG. 10, an embodiment of a drum 10a has 8 lugs 20b, 21b, 22b, 23b, 24b, 25b, 26b and 27b (generally "lugs"). Each lug has a corresponding location 20a, 21a, 22a, 23a, 24a, 25a, 26a and 27a (generally "tap location") where the drumhead is struck during tuning. The automatic tuning process begins by tuning each of the lugs as previously described and saving the pitch estimate proximal to each lug. A plurality of pitch-pairs is then calculated by averaging the pitch proximal to each lug with the pitch proximal to a diametrically opposed lug. For example, the pitch 20a proximal to lug 20b is averaged with the pitch 24a proximal to 24b, and similarly for lug 21b with 25b, 22b with 26b, and 23b with 27b resulting in four pitch-pairs. For each of the four resulting pitch-pairs, the pitch-pair with the lowest average pitch is chosen as a "primary pitch-pair."

For example, in the embodiment shown in FIG. 10 the average pitch associated with lugs 20b and 24b has the lowest average pitch and the primary pitch-pair is as shown based on pitch measurements at 20a and 24a. The primary pitch-pair has a first lug, 20b and a second lug 24b. Adjusting the pitch associated with the first lug 20b will affect the pitch associated with all lugs, however the greatest effect will be with respect to the adjacent lugs 27b and 21b due to the forces from the hoop 16, and also with respect to the diametrically opposed lug 24b.

After establishing which of the four pitch-pairs is the primary pitch-pair, if either the first lug 20b or the second lug 24b have substantially different pitches associated with them (e.g. a 0.25 Hz difference) then the lower pitch of the two lugs will be adjusted first, then the other lug will be adjusted. Subsequently, the next lowest pitch-pair will be chosen as the primary pitch-pair and a similar adjustment made until all pitches associated with each lug are adjusted.

If the pitch associated with the first lug 20b and the second lug 24b of the primary pitch-pair are not substantially different then the determination of which of the first lug 20b and the second lug 24b is to be adjusted next then depends on the secondary effects on the adjacent lugs. A first adjacent pitch-pair is determined by averaging the pitch associated with the lugs 27b and 21b adjacent to the first lug 20b. A second adjacent pitch-pair is determined by averaging the pitch associated with the lugs 25b and 23b adjacent to the second lug 24b. If the first adjacent pitch-pair has a lower average pitch than the second adjacent pitch-pair then the first lug 20b is adjusted before the second lug 24b, otherwise the second lug 24b is adjusted first. Subsequently, the next lowest pitch-pair will be chosen as the primary pitch-pair and a similar adjustment made until all pitches associated with each lug are adjusted. In the example embodiment of a drum 10b, eight lugs are shown. It should be appreciated that the automatic tuning method similarly applies to other drum embodiments.

Figure 11:
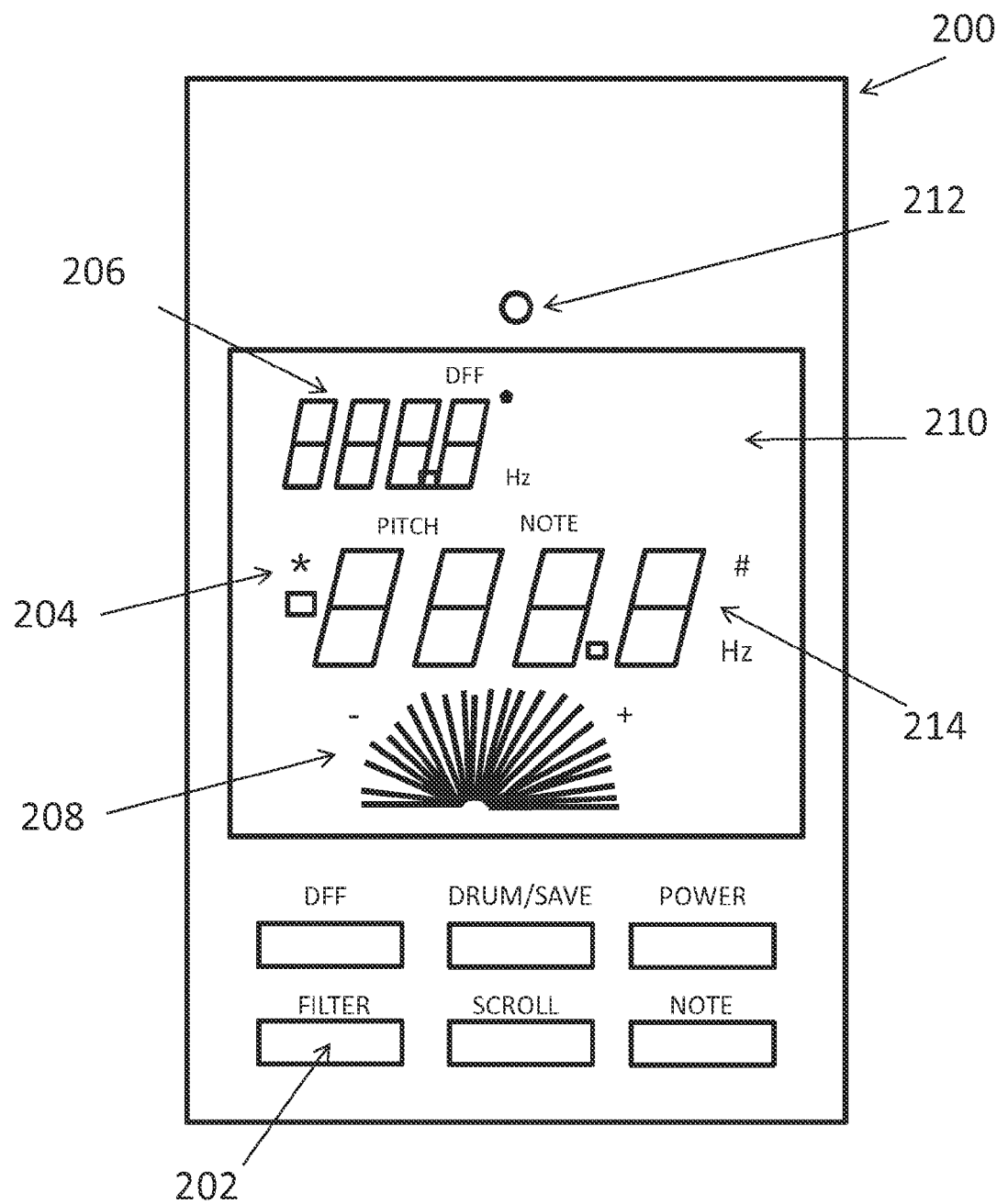
FIG. 11 is a front view of a tuning device, in accordance with an embodiment.

FIG. 11 is a front view of a tuning device 200, in accordance with an embodiment of the present inventive concepts. In order to uniformly tune a drum or other resonant structure, it is necessary to measure the frequency of the lowest overtone associated with tapping near different lugs. This involves identifying the second lowest frequency subset, for example, subset 33 illustrated at FIG. 3B, and determining a corresponding frequency. If the wrong frequency subset is selected, large frequency differences can be indicated from tapping near different lugs. If a much higher frequency is measured, it is likely that a higher overtone from the tap has been measured, for example, subset 45 illustrated at FIG. 3B. Alternatively, if a lower frequency is measured, it is likely that the fundamental, or overall, frequency of the drum has been measured, for example subset 30 illustrated at FIG. 3B. In either case, an undesired tone is detected instead of the lowest frequency overtone desired for tuning the lugs.

In an embodiment, the tuning device 200 includes a filter mode feature that provides a user with an option of rejecting undesirable overtones or the fundamental tone in such situations. The filter mode, when activated, switches a tunable bandpass filter to the signal path with a passband that is centered about the frequency of the lowest overtone frequency subset, and with stopbands that overlap the fundamental and higher overtone frequency subsets, respectively. A tunable bandpass filter for the drum spectrum in FIG. 3B can have a passband having a predetermined range, for example, from approximately 200 to 300 Hz and centered about 250 Hz.

The center frequency of the passband can be referred to as the filter mode reference frequency. The tunable bandpass filter can substantially attenuate all signals except for those comprising the lowest overtone and thereby provide the correct measurement of the corresponding lowest overtone frequency. In another embodiment, tunable bandpass filtering is performed by limiting the start and stop frequencies of the frequency band used in the peak selector 80 shown in FIG. 5. Here, the frequency band of the peak selector can be analogous to the passband of a tunable bandpass filter.

The filter mode can be activated by a user, for example, if the majority of lugs used for adjusting a drum's membrane tension are determined to generate a desired overtone and one or more other lugs generate questionable or undesirable values. The tuning device 200 includes a module, which can include processing hardware, software, or a combination thereof, and which measures a frequency or note related to the desired overtone. The user can select a FILTER button 202 at the tuning device 200, whereby signals corresponding to the fundamental tone or undesirable overtones are not considered during a tuning operation. In doing so, measured frequencies are displayed in a measured frequency display 214. An indicator 204 such as an asterisk can be generated next to the measured frequency display 214 to indicate that filtering is activated. As described below, a user can tap a region of the drum membrane, for example, a region proximal to a lug, to produce a signal. In response, a frequency measurement taken by the tuning device 200 can become the filter mode reference frequency, which is stored in a storage device such as a memory at the device 200, and is displayed in a reference frequency window 206 at the display 210. In an embodiment, the filter mode reference frequency can be stored in, and recalled from, a storage device such as a memory, buffer, or the like. Subsequent measurements taken, for example, proximal to lugs distributed about a perimeter of the drumhead, are filtered with a bandpass filter passband centered at the filter mode reference frequency displayed at the reference frequency window 206 and displayed at the measured frequency display 214. Other pitch-related data such as musical notes or the like can be displayed at the reference frequency window 206. When filtering is enabled in this manner, subsequent measurements taken will ignore frequencies that deviate significantly from the filter mode reference frequency, for example, frequencies that are outside a predetermined band, for example, +/−20% with respect to the filter mode reference frequency, thereby allowing the lowest overtone to be determined at or near each lug of the drumhead. Filtering can be disabled by selecting the FILTER button 302 again.

Prior to activating a filter mode, it is necessary for a user to identify and measure the nominal frequency of the lowest overtone. During a tuning operation, several measurements may be taken by tapping the drumhead close to the various tuning lugs. If a determination cannot be made as to which measured frequency is the lowest overtone frequency, a user can perform one or more tests involving touching the drumhead with one finger while tapping the drum near a lug, which can clear up any ambiguity. Touching the center of the drumhead while tapping can mute the fundamental drum frequency if an unusually low frequency is detected near some lugs. Alternatively, the opposite drumhead can be muted by placing it on a towel, or on a rug, or on a drum stool, or by some other means. Otherwise, touching the edge of the drumhead at a position roughly 90 degrees from where the drum is tapped can suppress undesirable higher frequency overtones.

The tuning device 200 can include an LED 212 that is temporarily illuminated when an acoustic signal is received by the tuning device 200 that exceeds a trigger threshold, for example, described herein. The LED 212 can be activated, i.e., lit, when an adjacent drum-head region is tapped.

In an embodiment, the filter mode reference frequency is determined from measurements taken by the tuning device 200, for example, described above. In other embodiments, the filter mode reference frequency can be specified, for example, entered to the tuning device 200 by a user.

In an embodiment, as shown in FIG. 11, the measured frequency display 214 displays values corresponding to signals generated from tapping a drum membrane during a tuning operation as frequencies (in Hz). In other embodiments, the values can be displayed in other well-known units of measurement, for example, displayed as notes, octaves, and the like. The tuning device 200 can display a notes indicator 216 when displaying the values as notes, octaves, or the like. The tuning device 200 can include a dial 208 that indicates whether a measured signal is sharp or flat.

Figure 12:
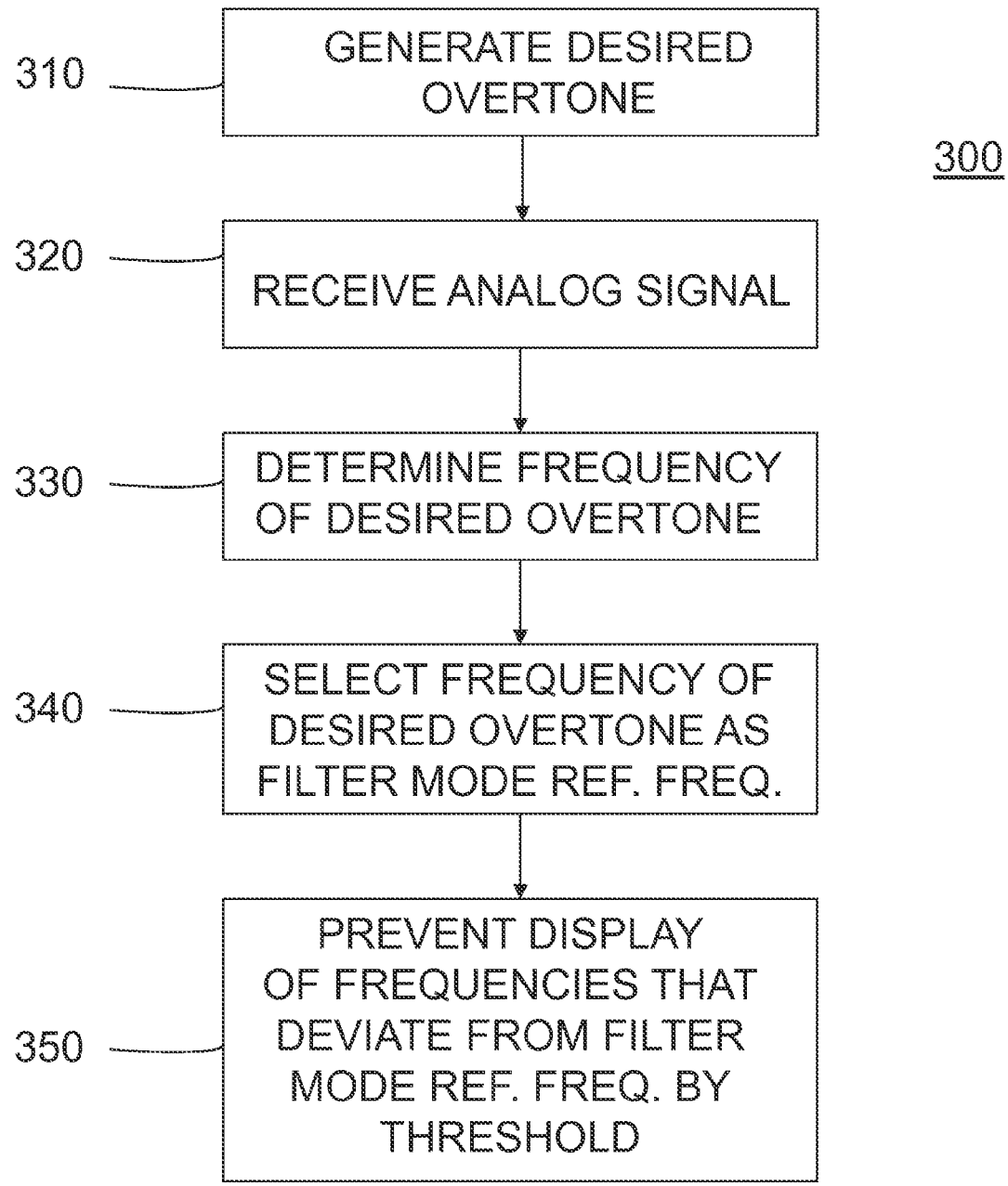
FIG. 12 is a flow diagram of a method for resonance tuning, in accordance with an embodiment.

FIG. 12 is a flow diagram of a method 300 for resonance tuning, in accordance with an embodiment. In describing the method 300, reference is made to one or more tuning devices and methods described herein.

At block 310, a resonant structure such as a drumhead membrane is tapped close to the tuning lugs, for example, shown in FIG. 1, by tapping at a region of the membrane 12 proximal the lugs 23b, 24b, in order to induce the vibration and generate the associated sound of the desired, i.e., typically the lowest frequency, overtone of the membrane 12. The center of the drumhead membrane 12 may also be muted by lightly touching it or the opposite drumhead membrane may be muted so as to suppress the generation of the fundamental mode of vibration when it is tapped.

At block 320, a signal, for example, an analog or digital signal, is received at a tuning device, for example, the tuning device 200 shown in FIG. 11. For example, the tuning device 200 is positioned over a resonant structure, e.g., a drum, sufficiently close, e.g. a few inches, to detect a sound or vibration from a resonant structure such as a drumhead membrane. The signal relates to the generated desired overtone.

At block 330, a nominal frequency of a desired overtone is determined from the signal using tuning device 200. Subsequent frequency measurements associated with tapping proximal to other tuning lugs will differ in value somewhat depending on how evenly the drumhead is in tune. However, unless the drumhead is grossly out of tune, the frequency measurements associated with the various lugs will be within +/−20% of one another.

At block 340, if the filter mode has been activated, by pressing the FILTER button, for example, the frequency of the desired overtone is selected as a filter mode reference frequency, and optionally displayed. Filtering is applied to reject overtones or the fundamental tone in cases where an undesired tone is detected instead of the lowest frequency overtone needed for tuning the lugs. Here, the latest measurement taken with filtering enabled will ignore frequencies that deviate significantly from the filter mode reference frequency, i.e. deviate by a predetermined threshold, typically +/−20%. This, in effect, introduces a bandpass filter centered at the filter mode reference frequency with a bandwidth extending from 20% below the filter mode reference frequency to 20% above the filter mode reference frequency. Accordingly, at block 350, frequencies that deviate from the filter mode reference frequency by a predetermined threshold, in particular, frequencies outside of the passband of the bandpass filter, are prevented from being display, or otherwise suppressed or attenuated.

Figure 13A:
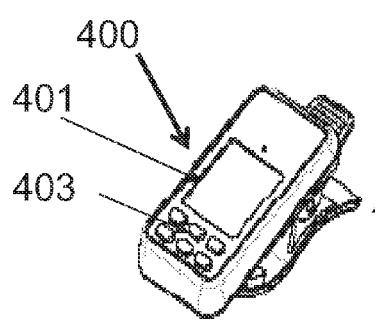
FIG. 13A is a perspective view of a tuning device clamp coupled to a drum tuner, in accordance with an embodiment.
Figure 13B:
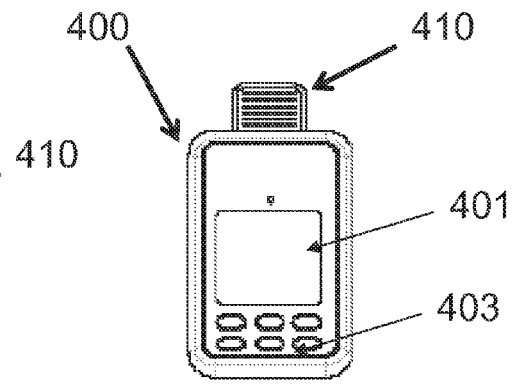
FIG. 13B is a front view of the tuning device clamp and drum tuner of FIG. 13A, in accordance with an embodiment.
Figure 13C:
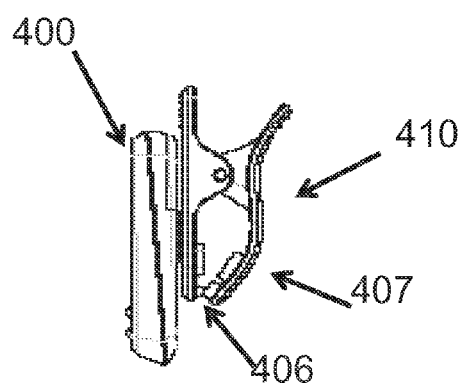
FIG. 13C is a side view of the tuning device clamp and drum tuner of FIGS. 13A and 13B, in accordance with an embodiment.
Figure 13D:
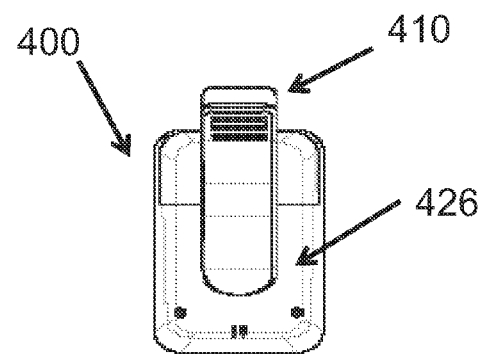
FIG. 13D is a rear view of the tuning device clamp and drum tuner of FIGS. 13A-13C, in accordance with an embodiment.
Figure 13E:
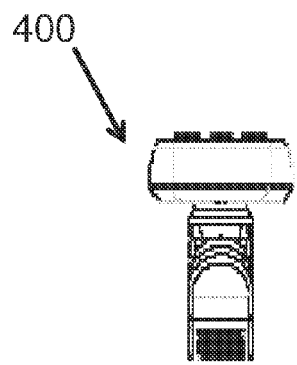
FIG. 13E is an end view of the tuning device clamp and drum tuner of FIGS. 13A-13D, in accordance with an embodiment.
Figure 13F:
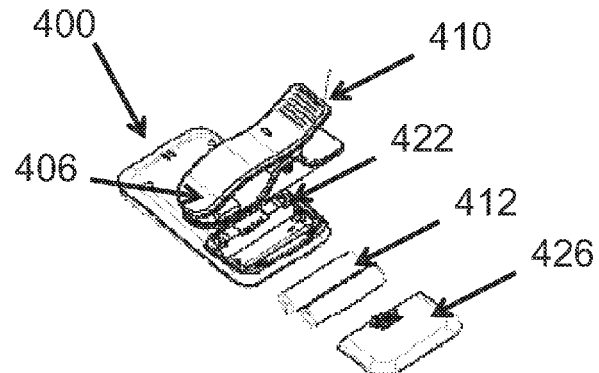
FIG. 13F is a perspective view of a rear perspective view of the tuning device clamp and drum tuner of FIGS. 13A-13E, where a rear cover of the drum tuner 400 is removed to expose batteries, in accordance with an embodiment.
Figure 14:
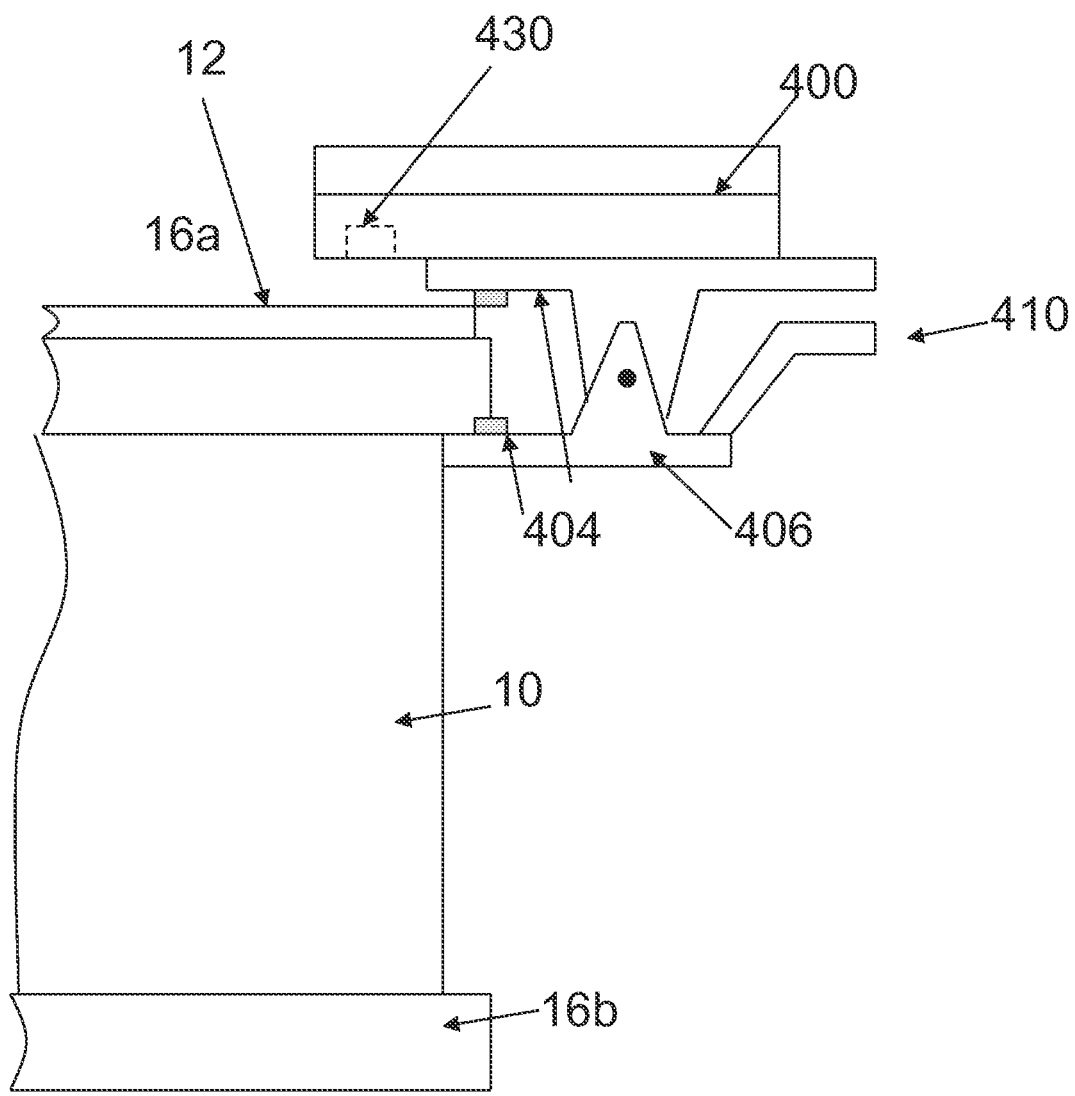
FIG. 14 is a side view of the tuning device clamp and drum tuner of FIGS. 13A-13F clamped to a drum, in accordance with an embodiment.
Figure 15:
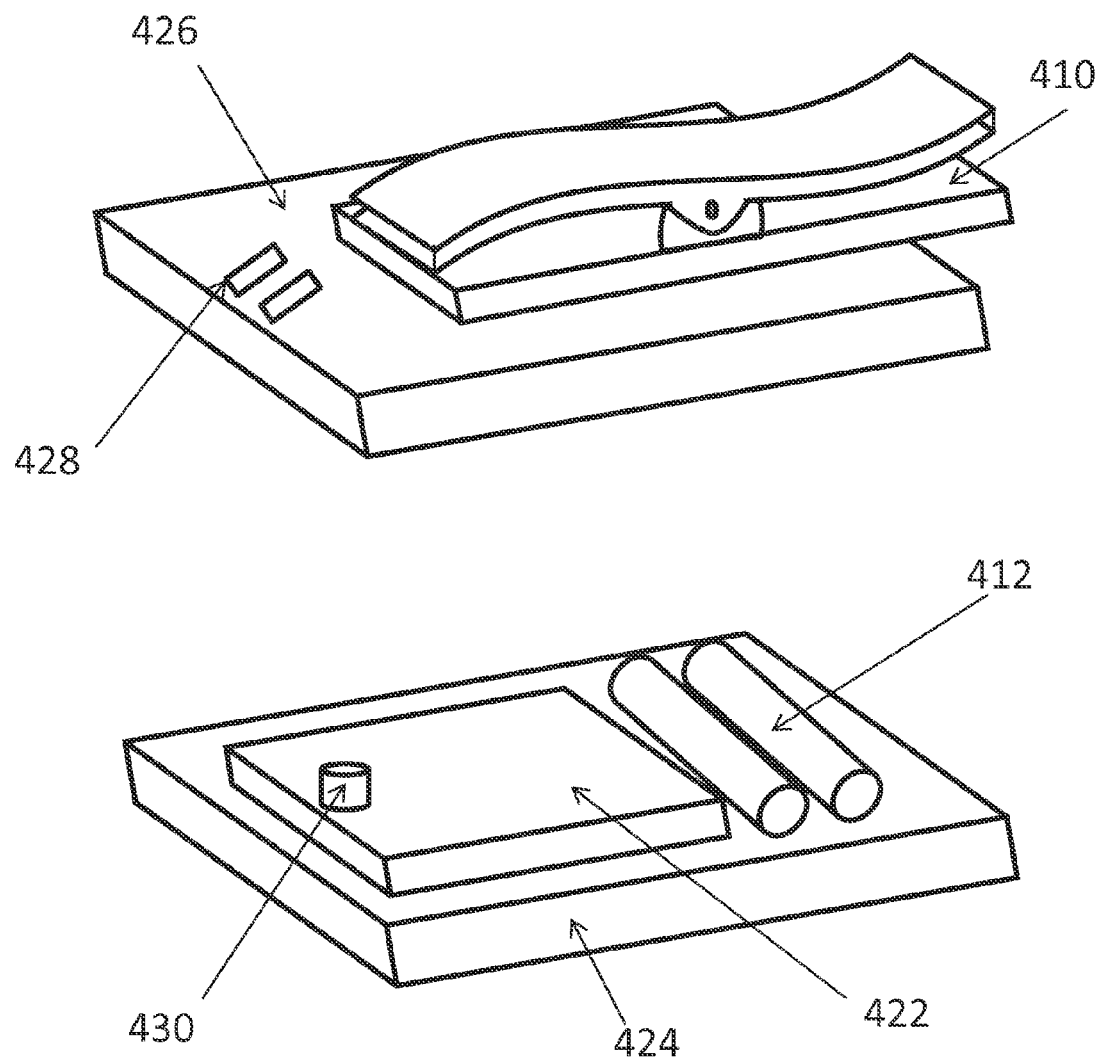
FIG. 15 is a rear perspective view of a tuning device clamp and drum tuner, where a rear cover of the drum tuner is removed to expose a printed circuit board (PCB), a microphone, and batteries, in accordance with an embodiment.

FIG. 13A is a perspective view of a tuning device clamp 410 coupled to a drum tuner 400, in accordance with an embodiment. FIG. 13B is a front view of the tuning device clamp 410 and drum tuner 400 of FIG. 13A, in accordance with an embodiment. FIG. 13C is a side view of the tuning device clamp 410 and drum tuner 400 of FIGS. 13A and 13B, in accordance with an embodiment. FIG. 13D is a rear view of the tuning device clamp 410 and drum tuner 400 of FIGS. 13A-13C, in accordance with an embodiment. FIG. 13E is an end view of the tuning device clamp 410 and drum tuner 400 of FIGS. 13A-13D, in accordance with an embodiment. FIG. 13F is a rear perspective view of the tuning device clamp 410 and drum tuner 400 of FIGS. 13A-13E, where a rear cover 426 of the drum tuner 400 is removed to expose batteries, in accordance with an embodiment. The rear cover 426 can be a portion of a rear surface of the drum tuner 400 as shown in FIG. 13E, or can include the entire rear surface as shown in FIG. 15. FIG. 14 is a side view of the drum tuner clamp 410 and drum tuner 400 attached to a drum 10 in accordance with an embodiment.

When tuning a drum 10, it is desirable to have both hands free so that one hand can hold a drum-stick for tapping while the other hand holds a drum-key for adjusting lug tension. However, a hand-held tuner requires a user to alternately hold a drum-stick or a drum-key and thereby slows down the tuning procedure. Embodiments of the invention overcome this limitation by incorporating a clamp 410. In particular, the clamp 410 can be constructed and arranged to hold the tuner 400 in place during drum tuning so that the user has the use of both hands, by attaching to the rim of most commercial drums, for example, the hoop rim 16 of the drum 10 of FIG. 14. The tuner 400 to which the clamp 410 is coupled can be the same as or similar to other tuners described herein. The clamp 410 includes rubber pads 404 on a pair of gripping jaws 406. The jaws 406 can include notches 407 as shown in FIG. 13C so as to accommodate the staggered positioning of the top and bottom edges of the rim 16a, b in order to securely attach the tuner 400 to the drum 10, in particular, a hoop 16a that holds a drumhead 12 of the drum 10 in place.

The clamp 410 is attached to the tuner 400 such that a microphone 430 mounted on the bottom of the tuner 430 extends over the drumhead 12 in order to detect the acoustic signal from the drumhead 12 without significant attenuation. The clamp 410 and tuner 400 configuration positions the microphone 430 directly over the edge of the drumhead 12 to improve the sensitivity with respect to sensing the acoustic overtone signal produced by tapping the drum near at the edge near a lug.

It is important for the microphone 430 to be in close proximity and to directly face the drumhead 12. This positioning enables the acoustic signal from the vibrating drumhead 12 to be sensed with a large signal to noise ratio.

Figure 19:
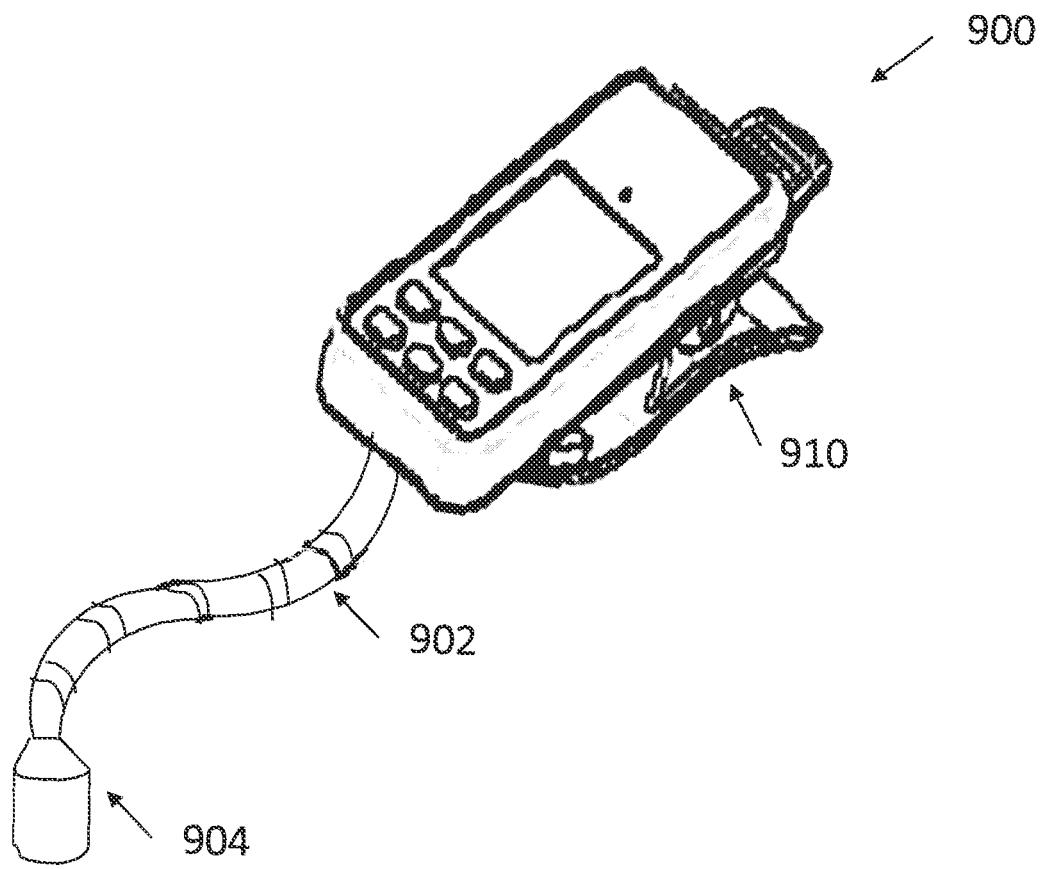
FIG. 19 is a perspective view of a tuning device, in accordance with another embodiment.

In an embodiment, as shown in FIG. 19, tuning device 900 can include an omni-directional microphone 904 that can be positioned directly above the center of a drumhead. This provides equal proximity from the microphone 904 to any point along the periphery of the drumhead, thereby eliminating position-dependence. The drum tuner 400 can be attached to the drumhead 12 via a clamp 910, which can be similar to or the same as the clamp 410 shown in FIGS. 13-15. The microphone 904 can be remote from the tuning device 900, and suspended above the center of the drumhead 12. In an embodiment, the microphone 904 can be a position-adjustable microphone, which can be implemented with a gooseneck support 902. In an embodiment, a goose-neck microphone is attached to a separate clip that is attached to a hoop of the drum. The microphone 904 can include a cable that provides an electrical connection to the tuner 900. The cable can be terminated with an electrical connector, such as a mini-jack that mates with a matching connector on the tuner 900. The cable can alternatively be coupled directly to the tuner 900, for example, in the absence of separate connectors. In another embodiment, a telescoping antenna-style support can be provided.

FIG. 15 is a perspective view of a tuning device clamp 410 and drum tuner 400, where a rear cover 426 of the drum tuner 400 is removed to expose a PCB 422, a microphone 430, and one or more batteries 412, in accordance with an embodiment. If the microphone 430 is placed directly over the edge of a drumhead 12, the overtones produced by tapping near the lugs are acquired with a higher sensitivity than the fundamental pitch of the drum. FIG. 2 illustrates a typical time domain signal acquired with a microphone positioned in this manner and FIG. 3A illustrates the associated spectral response indicating good resolution of the overtones produced by the drumhead when tapped. One aspect of the inventive concepts includes locating the microphone 430 on the underside of the tuner 400, facing downward, i.e., on the opposite side from the display 401 and push-buttons 403 of the tuner 400 at the lower end, or the display 401 only in an embodiments where the display 401 includes a touchscreen, which can be used where no physical buttons are provided. With this underside microphone location, the microphone 430 points directly towards the drumhead 12 being measured while allowing the display 401 to be visible and accessible to the user as shown in FIGS. 13A and B. In an alternative embodiment the microphone can be directed at the end of the tuner 400. In other embodiments, the microphone can be adjacent the display.

The microphone 430 can be coupled to the PCB 422 which in turn is positioned in a tuner case 424. The PCB 422 can include a processor and a memory and/or other electronic components for executing one or more of the methods described herein. The batteries 412 can be collocated with the PCB 422, and provide power to the PCB 422, for example, for operation of the microphone 430. The clamp 410 can be coupled to the removable rear cover 426. The rear cover 426 can include openings so that signals, for example, sound, can be exchanged with the microphone 430 during operation. In this manner, the microphone is at an opposite side of the tuner 400 as the buttons, display, etc. shown in FIGS. 13A and 13B.

The clamp is coupled to the hoop that holds the drumhead in place, but is not actually coupled to the surface.

Figure 16:
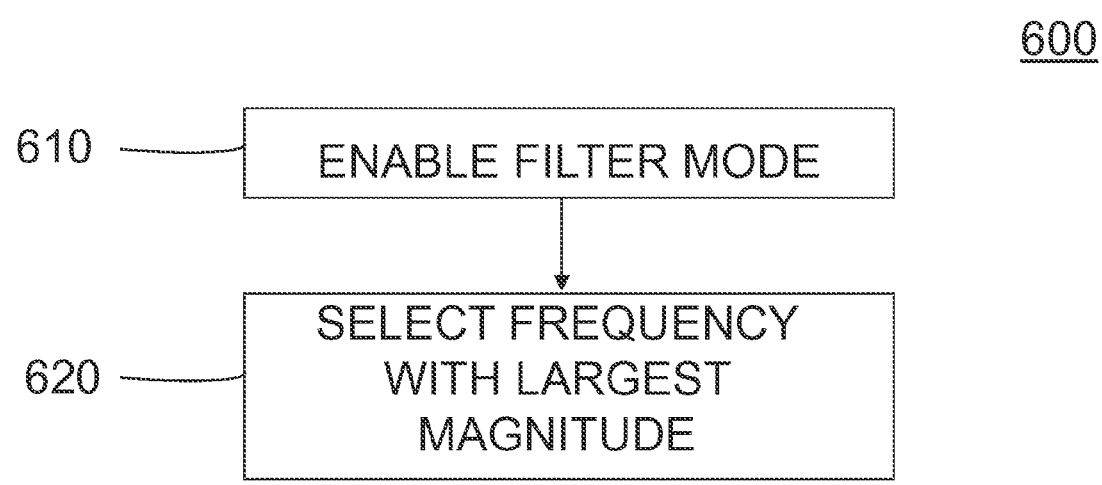
FIG. 16 is a flow diagram of a method for pitch detection, in accordance with an embodiment.

FIG. 16 is a flow diagram of a method 600 for pitch detection, in accordance with an embodiment. In describing the method 600, reference is made to one or more tuning devices described herein.

Pitch detection, as outlined herein, can comprise analyzing the power spectrum of the received signal and determining the fundamental subset having the spectral peak with the lowest frequency and selecting the spectral peak with the largest magnitude in the fundamental subset as the fundamental spectral peak. Another method of pitch detection that is useful with the filter mode described herein includes selecting the frequency of a power spectrum frequency sample with the largest magnitude that falls within the passband of a tunable bandpass filter. The method 600 can apply to cases where the fundamental spectral peak or a higher frequency overtone has a larger magnitude than the lowest frequency overtone. Here, at block 610, a filter mode is enabled, for example, as described in FIGS. 11 and 12. The filter mode, when enabled, limits the range of frequency samples to a frequency band centered about a previously measured and stored frequency, the filter mode reference frequency, in particular, close to the expected lowest frequency overtone.

With a filter mode enabled in this manner, pitch detection can comprise, at block 620, selecting the frequency of the power spectrum frequency sample with the largest magnitude, or peak, from a subset of power spectrum frequency samples taken between a low and upper frequency limit.

In another embodiment, pitch detection can comprise determining the weighted average of the frequency of peaks in the subset of peaks, that includes the largest peak magnitude. The lower and upper frequency limits can be in a frequency band surrounding the filter mode reference frequency, which is stored in a memory of tuner 400.

U.S. Patent Application Publication No. 2011-0179939, the contents of which are incorporated by reference in their entirety, describes the ability to store and recall specific or measured pitch frequencies or musical notes as data to enable the user to tune or retune a drum or drumset. In particular, a pitch-set processor is described that includes the capability of calculating and outputting the deviation of a measured pitch from a desired or reference pitch. In an embodiment, the data corresponding to measured pitch frequencies, musical notes, and the like are combined with this determined deviation, or difference mode, to enable a user to easily tune to a previously stored pitch, shown by way of example at FIGS. 17 and 18. One or more measured pitches can be displayed at the measured frequency display 214 of the tuning device 200. On the other hand, stored data, for example, values corresponding to frequencies, musical notes, or the like, can be displayed at the reference frequency window 206.

Figure 17:
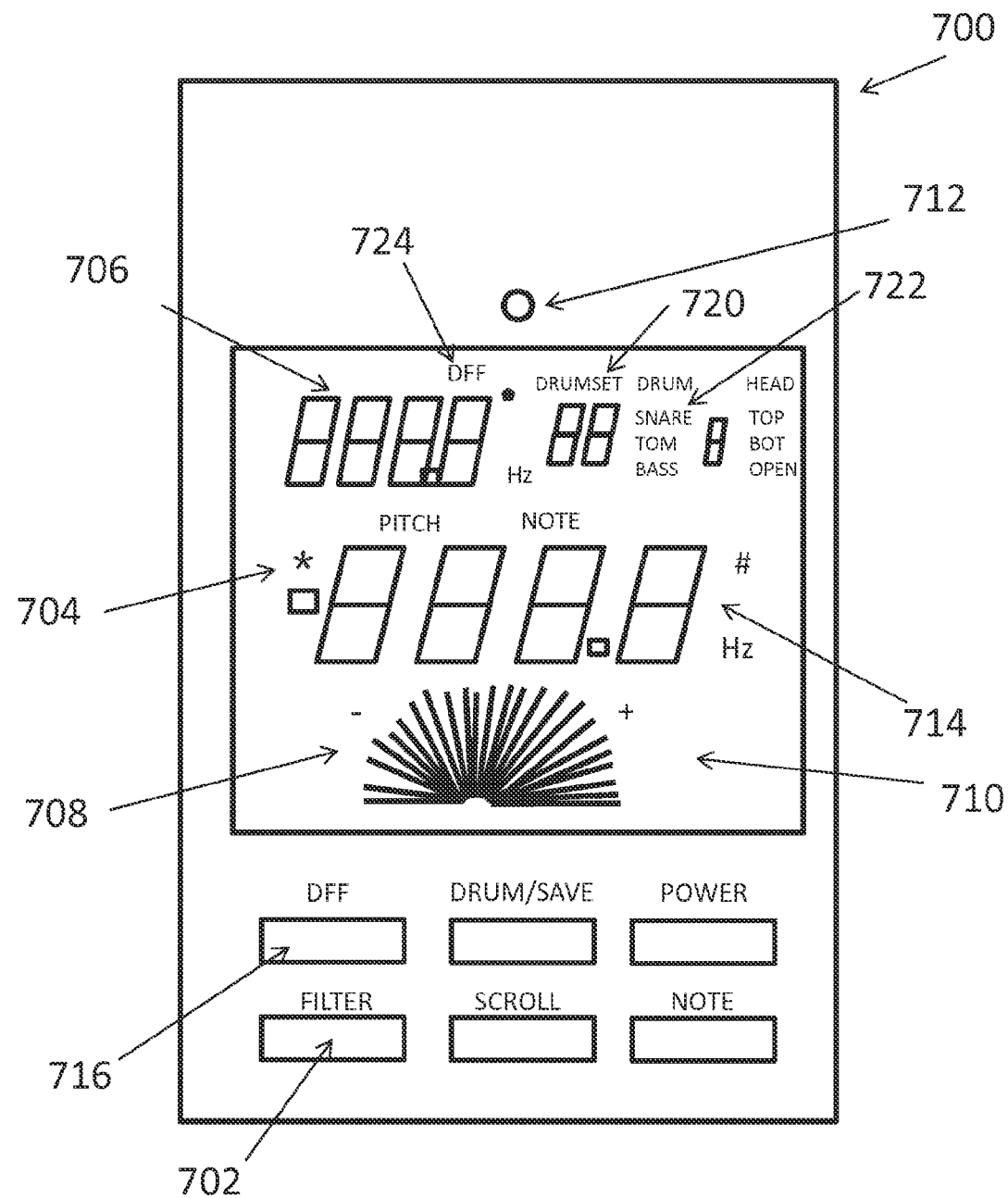
FIG. 17 is a front view of a tuning device, in accordance with another embodiment.

FIG. 17 is a front view of a tuning device 700, in accordance with another embodiment of the present inventive concepts. The tuning device 700 can be similar to other tuning devices described herein such as the tuning device 300 shown and described with reference to FIG. 12. For example, the tuning device 700 can include an indicator 704 and a dial 708 similar to the indicator 304 and a dial 308, respectively. Details regarding the indicator 704, the dial 708, and other similar elements are not repeated for reasons related to brevity.

Figure 18:
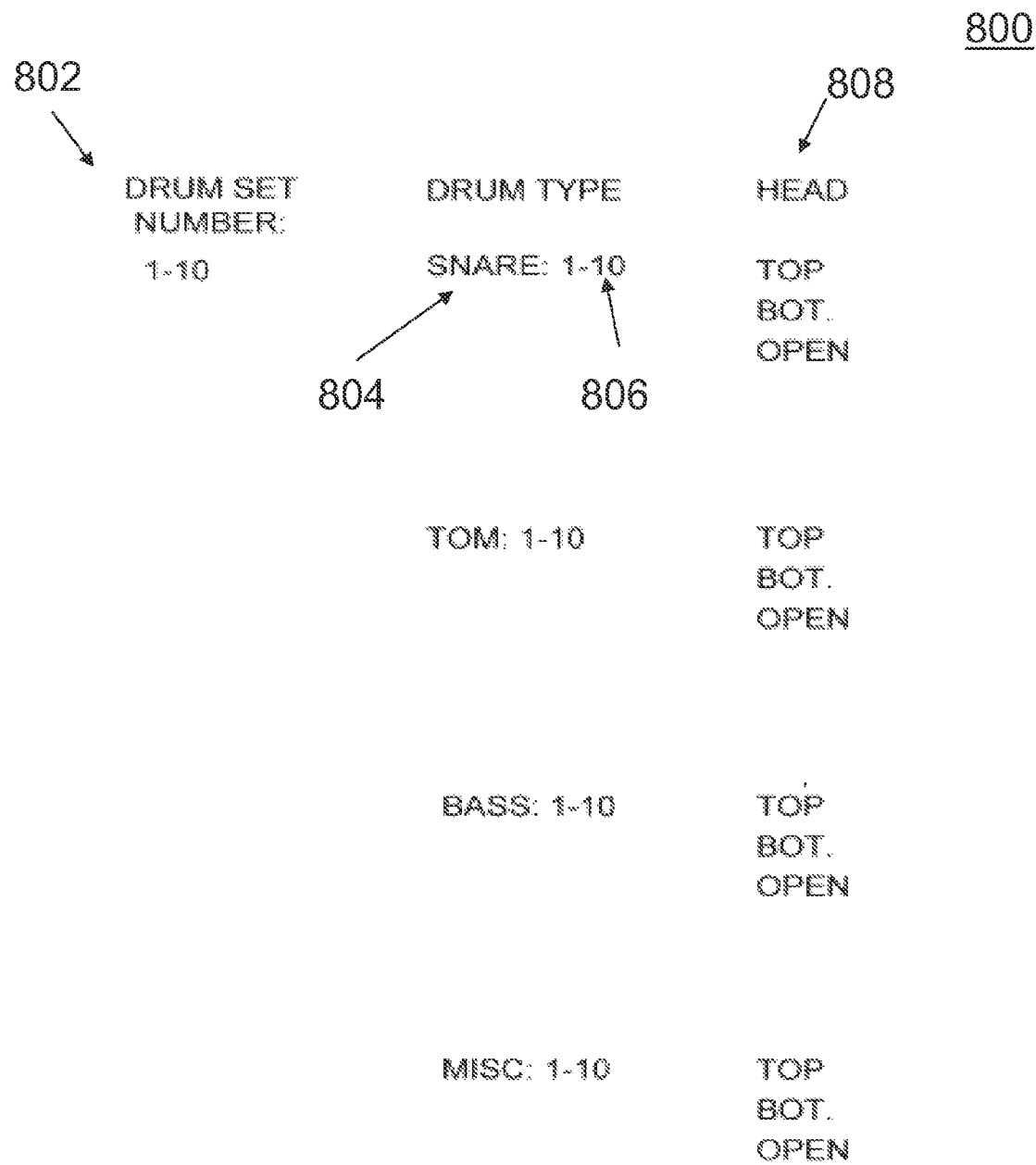
FIG. 18 is a set of data options for tuning to a pitch, in accordance with an embodiment.

The tuning device 700 includes a memory (not shown) and a display 710 associated with a pitch store and recall feature. The display can present a drum set window 720, a drum type window 722, and a head type window 728 to allow a user to manage the stored pitches for a large assortment of drums and drum-sets. As shown in FIG. 18, a drum set number 802 can be between 1 and 10 and used to specify a drum set, which can be displayed at the drum set window 720. A drum-type enumerator 804 consisting of enumerated types: snare, tom, bass, and miscellaneous (misc) can be used to specify the drum type. A drum-type number 806, for example, between 1 and 10, is used to specify the number of the drum type, which can be displayed at the drum type field 722. The head-type 808 can comprise enumerated types: top, bottom and open (overall or fundamental), which can be used to specify the drumhead, and displayed at the head type window 728.

There are several approaches for generating a reference pitch in a difference mode, for example, described herein. In this approach, one or more selected pitches can be calculated. In another approach, the pitch data can be a recent measurement or a previously stored pitch.

In an embodiment, an immediate difference mode is invoked. Here, the tuning device can include a module, which can include processing hardware, software, or a combination thereof. The current measurement can be stored in a memory at the tuning device and used as the difference mode reference value. This is useful in matching lug pitches with the pitch of one or more of the lugs, which can be saved and used as the reference pitch for tuning the other lugs of a drumhead. In a preferred embodiment, the immediate difference mode is invoked by entering a difference mode by activating the DIFF button 716. Here, a difference mode (DIFF) indicator 724 can be displayed, indicating that the difference mode is activated. When invoking the immediate difference mode, the drum-set number 802 is equal to zero and/or the drum-type number 806 is equal to zero. When the difference mode is enabled, a difference mode reference frequency is displayed in the reference display 706 and the difference between the latest measurement and the difference mode reference frequency is displayed in the primary display 714 having a measured value window. The difference mode reference frequency can be either the current measurement when the difference mode is enabled or a previously saved measurement.

In an embodiment for immediate difference mode, the difference mode reference frequency can be the latest measurement, prior to activating difference mode with a zero drum set value or a zero drum-type number value to aid the user in tuning a drum to a pitch associated with one of the tuning lugs pitch. During operation, the user adjusts the tension of the drumhead at various lugs until the difference display shown in the measured value field 714 and also indicated by the dial display 708 is approximately equal to zero and the drumhead pitch equals the desired lug pitch, that is, the difference mode reference frequency.

In another embodiment, use of a previous stored pitch for the difference mode reference frequency instead of the current measurement is selected by entering a difference mode, for example, by pushing the DIFF button with a non-zero drum set value, and a non-zero drum-type number selected. In other words, a drum-set or drum-type number of zero selects the current measurement for the difference mode reference frequency and any non-zero number selects a stored pitch. In this case, the corresponding recalled pitch is used as the difference mode reference frequency.

As will be appreciated by one skilled in the art, aspects of the present inventive concepts may be embodied as a system, method, or computer program product. Accordingly, aspects of the present inventive concepts may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive concepts may take the form of a computer program product embodied in one or more computer readable medium(s) having computer readable program code embodied thereon.

Any combination of one or more computer readable medium(s) may be utilized. The computer-readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer-readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire-line, optical fiber cable, RF, etc., or any suitable combination of the foregoing.

Computer program code for carrying out operations for aspects of the present inventive concepts may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive concepts are described below with reference to flowchart illustrations and/or block diagrams of methods, apparatus (systems) and computer program products according to embodiments of the present inventive concepts. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present inventive concepts. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present inventive concepts has been shown and described with reference to specific preferred embodiments, it should be understood by those skilled in the art that various changes in form and detail may be made therein without departing from the spirit and scope of the present inventive concepts as defined by the following claims.

The invention claimed is:

1. A method for resonance tuning, comprising:
receiving a signal in response to a resonance of a structure;
determining a frequency or musical note related to an overtone from the signal;
selecting the frequency or musical note related to the overtone as a filter mode reference frequency or musical note; and
suppressing a display of frequencies or musical notes from a subsequent signal that deviate from the filter mode reference frequency or musical note by a predetermined threshold.

2. The method of claim 1, further comprising:
displaying the frequency or musical note of the overtone as the filter mode reference frequency or musical note.

3. The method of claim 1, wherein suppressing the frequencies or musical notes from a subsequent signal that deviate from the filter mode reference frequency or musical note by a predetermined threshold includes filtering the frequencies or musical notes of the subsequent signal to reject overtones or a fundamental tone.

4. The method of claim 1, further comprising providing a bandpass filter centered at the filter mode reference frequency or musical note with a passband bandwidth extending from a predetermined frequency or frequency ratio below the filter mode reference frequency or musical note to a predetermined frequency or frequency ratio above the filter mode reference frequency or musical note, and suppressing frequencies that are outside of the passband bandwidth.

5. The method of claim 1, wherein suppressing the frequencies from a subsequent signal that deviate from the filter mode reference frequency by a predetermined threshold includes limiting the start and stop frequencies of a frequency band used in a peak selection.

6. A tuning device, comprising:
a receiver constructed and arranged to receive a signal generated in response to a resonance of a structure;
a module that determines a frequency or musical note related to an overtone from the signal;
a memory that stores the frequency or musical note related to the overtone as a filter mode reference frequency or musical note; and
a filter that suppresses a display of frequencies or musical notes that deviate from the filter mode reference frequency or musical note by a predetermined threshold.

7. The tuning device of claim 6, further comprising:
a display that displays at least one of the filter mode reference frequency or musical note and frequencies or musical notes within the predetermined threshold.

8. The tuning device of claim 7, further comprising a microphone at an opposite side of the tuner as the display.

9. The tuning device of claim 6, wherein the filter filters the frequencies or musical notes to reject overtones or a fundamental tone.

10. The tuning device of claim 6, wherein the filter comprises a bandpass filter centered at the filter mode reference frequency or musical note with a passband bandwidth extending from a predetermined frequency or frequency ratio below the filter mode reference frequency or musical note to a predetermined frequency or frequency ratio above the filter mode reference frequency or musical note, and suppressing frequencies that are outside of the passband bandwidth.

11. The tuning device of claim 6, wherein the filter limits the start and stop frequencies of a frequency band used in a peak selection.

12. The tuning device of claim 6, wherein the memory stores measured frequencies or musical notes that are within the predetermined threshold, and wherein the measured frequencies or musical notes that are within the predetermined threshold are retrieved from the memory for display at the tuning device.

13. A method for pitch detection, comprising:
providing one or more power spectrum frequency samples;
selecting a frequency in a frequency band having a largest power spectrum magnitude from the one or more power spectrum frequency samples, the frequency band having an upper frequency limit and a lower frequency limit.

14. The method of claim 13, further comprising:

determining a weighted average frequency of a plurality of peaks of the samples; and displaying the weighted average frequency from the plurality of peaks.

15. The method of claim 13, further comprising:

storing measured pitch frequencies of the one or more power spectrum frequency samples at a storage device; and displaying at least one of the stored measured pitch frequencies.

* * * * *